(12) United States Patent
Hisada et al.

(10) Patent No.: US 7,780,296 B2
(45) Date of Patent: Aug. 24, 2010

(54) PROJECTION OPTICAL UNIT, PROJECTION-TYPE IMAGE DISPLAYING APPARATUS AND PROJECTION-TYPE IMAGE DISPLAYING SYSTEM

(75) Inventors: Takanori Hisada, Yokohama (JP); Koji Hirata, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 12/145,630

(22) Filed: Jun. 25, 2008

(65) Prior Publication Data
US 2009/0059185 A1 Mar. 5, 2009

(30) Foreign Application Priority Data
Aug. 31, 2007 (JP) ............... 2007-225870

(51) Int. Cl.
G03B 21/14 (2006.01)
G03B 21/28 (2006.01)

(52) U.S. Cl. ............... 353/70; 353/69; 353/77; 353/101; 359/649; 359/813; 359/823

(58) Field of Classification Search ............... 353/69, 353/70, 77, 98, 101; 359/448, 649, 726, 359/813, 823, 846, 850
See application file for complete search history.

(56) References Cited

U.S. PATENT DOCUMENTS
2009/0115975 A1* 5/2009 Ogura ............... 353/98

FOREIGN PATENT DOCUMENTS
JP 5-134213 5/1993
JP 2000-162544 6/2000
JP 2004-157560 6/2004

* cited by examiner

Primary Examiner—Kevin Pyo
(74) Attorney, Agent, or Firm—Antonelli, Terry, Stout & Kraus, LLP.

(57) ABSTRACT

A projection optical unit for obliquely projecting an image displayed on an image display element upon a projection surface, enlargedly, comprises: a lens group, being disposed neighboring to the image display element, and including a plural number of projection lenses therein; and a reflection mirror for reflecting lights emitting from the lens group, to be projected onto the projection surface, obliquely, wherein assuming that a light beam, emitting from a center of the display screen of the image display element, passing through a center of an entrance pupil of the lens group, and entering into a screen center on the projection surface, is a screen center light beam, then the screen center light beam is incident upon the projection surface, obliquely, with respect to a normal line thereon, the lens group comprises a front lens group including a plural number of refraction lenses, being disposed thereafter directing from the image display element to the projection surface and having rotationally symmetric surface configurations, and a rear lens group including a refraction lens having a negative power and having a rotationally symmetric surface configuration and a plural number of lenses having rotationally asymmetric free curved surface configurations, and within the rear lens group, the lens having the negative power is movable in an optical axis direction, and at least one pieces among the lenses having the free curved surface configurations is movable into directions, including the optical axis and direction perpendicular thereto, within a surface including the optical axis and the normal line on the screen.

12 Claims, 13 Drawing Sheets

PROJECTION OPTICAL UNIT, PROJECTION-TYPE IMAGE DISPLAYING APPARATUS AND PROJECTION-TYPE IMAGE DISPLAYING SYSTEM

BACKGROUND OF THE INVENTION

The present invention relates to a projection optical unit for projecting an image on an image display element, enlargedly, upon a projection surface, such as, a screen or the like, and it relates, in particular, to a projection optical unit, being suitable for an image displaying apparatus of a front projection type, and further it relates to a projection-type image displaying apparatus and a projection-type image displaying system, applying such the projection optical unit therein.

In a color image displaying apparatus for projecting an image on an image display element, enlargedly, upon a screen (i.e., a projection surface) through a projection optical unit being constructed with a plural number of lenses, it is required to obtain an enlarged image having a sufficient largeness on the screen, but without distortion. Also, at the same time, for obtaining an easiness of handling of the apparatus, it is required to shorten a projection distance. For achieving this is already known an optical system for projecting an image, enlargedly, upon the screen, from an oblique direction (hereinafter, this is called an "oblique projection"), and as is described in the following Patent Documents 1 and 2, there is already known a projecting apparatus or an optical system for enlarging and projecting an image onto the screen, in the oblique direction, while shifting the projection screen into the vertical direction with respect to an optical axis of a projection system, with using an additional optical system, being also disposed inclining by a predetermined angle with respect to the optical axis of the projection. However, the additional optical system (e.g., an afocal converter) mentioned herein is an optical system having a function of converting sizes of a projection image, i.e., for obtaining an oblong projection image while compensating/reducing distortions of the projection image accompanying the projection into the oblique direction with respect to the screen.

Also, there is already known a reflection-type image forming optical system, for projecting an image on the image display element onto a screen (i.e., a projection screen), enlargedly, but with using a plural number of reflection mirrors (e.g., reflection-type optical elements) in the place of the lenses (e.g., transmission-type optical elements) mentioned above, for example, in the following Patent Document 3.

[Patent Document 1] Japanese Patent Laying-Open No. Hei 5-134213 (1993);

[Patent Document 2] Japanese Patent Laying-Open No. 2000-162544 (2000); and

[Patent Document 3] Japanese Patent Laying-Open No. 2004-157560 (2004).

BRIEF SUMMARY OF THE INVENTION

Thus, when projecting the image onto the screen from the oblique direction, then so-called a trapezoidal distortion is generated on the projection image. For dissolving this, the projection optical unit described in the Patent Document 1 mentioned above adopts the structures of suppressing the trapezoidal distortion, by shifting the additional optical system (e.g., the afocal converter), which is disposed on the screen side. However, with lenses for building up such the eccentric additional optical system, it is difficult to obtain a wide-angle because of low magnification thereof, and therefore, for obtaining a projection image having a necessary magnification, the distance from the projection apparatus up to the screen comes to be large, and the distance also comes to be long, between the projection screen and the projection system; i.e., there is a drawback that the apparatus comes to be large (in particular, length of the optical unit in the optical axis direction thereof). In addition thereto, though it is necessary to adapt the additional optical system, having a large aperture, as the lenses for building up the eccentric addition optical system mentioned above, but accompanying with this, this comes into a reason of increasing costs of the projection optical unit.

Also, with the projection optical unit described in the Patent Document 2 mentioned above, also similar to the Patent Document 1 mentioned above, it is difficult to achieve a wide-angle because of low magnification thereof, and there is also necessity of shifting the lenses to be used therein, separately or independently; therefore it is difficult to manufacture it. In addition thereto, it is also necessary to provide the addition optical system having the large aperture, and this comes into a reason of increasing costs of the projection optical unit.

On the other hand, with the reflection-type image forming system described in the Patent Document 3 mentioned above, a wide-angle is achieved, but suppressing a large-sizing of the image forming system, by applying a reflection optical system (i.e., reflection mirrors) in the place of the conventional transmission-type image forming optical system (i.e., a lens system). However, since an amount of eccentricity or shifting of the light upon the reflection mirrors, it is difficult to dispose those plural numbers of reflection mirrors at the correct positions thereof, in particular, within that apparatus, including an inclination angle thereof, for each. Also, due to vibrations or the like, since the inclination angles of those reflection mirrors can be changed, easily; therefore there is a problem that the manufacturing of that apparatus is extremely difficult.

Then, according to the present invention, taking the problems in the conventional arts mentioned above into the consideration thereof, an object thereof is to provide a projection optical unit and a projection-type image displaying apparatus applying the same therein, enabling the wide-angle, but without enlarging the apparatus, and also enabling the manufacturing thereof relatively easy. Thus, it is the object to provided a technology suitable for achieving, not only the projection distance, but also an outer configuration, being more compact, for the projection-type displaying apparatus itself, but without necessity of the additional optical system having a large aperture and also without generating the trapezoidal distortion therein.

According to the present invention, for accomplishing the object mentioned above, first of all, there is provided a projection optical unit for obliquely projecting an image displayed on an image display element upon a projection surface, enlargedly, comprising: a lens group, being disposed neighboring to said image display element, and including a plural number of projection lenses therein; and a reflection mirror for reflecting lights emitting from said lens group, to be projected onto said projection surface, obliquely, wherein assuming that a light beam, emitting from a center of the display screen of said image display element, passing through a center of an entrance pupil of said lens group, and entering into a screen center on said projection surface, is a screen center light beam, then said screen center light beam is incident upon said projection surface, obliquely, with respect to a normal line thereon, said lens group comprises a front lens group including a plural number of refraction lenses, being disposed thereafter directing from said image display element to said projection surface and having rotationally symmetric surface configurations, and a rear lens group including a refraction lens having a negative power and having a rotationally symmetric surface configuration and a plural number of lenses having rotationally asymmetric free curved surface configurations, and within said rear lens group, said lens having the negative power is movable in an optical axis direction, and at least one pieces among said lenses having the free curved surface configurations is movable into directions, including the optical axis and direction perpendicular thereto, within a surface including the optical axis and the normal line on said screen.

Also, according to the present invention, within the projection optical unit as described in the above, it is preferred that, within said lens group being movable, the lens having the rotationally asymmetric free curved surface configuration moves while keeping a predetermined relationship between a movement amount in the optical axis direction and a movement amount into direction perpendicular thereto, within a surface defined by including the optical axis and a normal line on the screen, and further that the position of said lens group being rotationally symmetric and having a negative power can move with keeping a predetermined relationship with said amount, while keeping an independency from said lens having the rotationally asymmetric free curved surface configuration.

Further, according to the present invention, within the projection optical unit as described in the above, it is preferable that a part of the plural numbers of lenses, building up said rear lens group and each having the rotationally asymmetric free curved surface configuration, has a curvature in a part passing through the light beam, which is incident upon a lower end portion of said projection surface, being larger than the curvature in a part passing through the light beam, which is incident upon an upper end portion of said projection surface, or that said rear lens group further includes, at least one (1) piece of a spherical surface lens having a negative power, other than said asymmetric lens.

Further, according to the present invention, within the projection optical unit as described in the above, it is preferable that said convex surface reflection mirror is a convex surface reflection mirror, being convex into the direction of reflection in a part thereof and rotationally asymmetric, wherein the curvature thereof, in a part reflecting the light beam to be incident upon the lower end portion of said projection surface, is made larger than that of a portion, reflecting the light beam to be incident upon the upper end portion of said projection surface, or that said convex surface reflection mirror is so formed that a portion, reflecting the light beam to be incident upon the lower end of said screen, is convex into the direction of reflection, while a portion, reflecting the light beam to be incident upon the upper end of said screen is concave into the direction of reflection.

In addition thereto, according to the present invention, within the projection optical unit as described in the above, it is preferable that the following equation is satisfied:

$$|L1-L2|<1.2*\sin \theta s*Dv$$

where assuming a distance of a route for the light beam emitting from a reflection surface of said reflection mirror and incident upon the upper end of said projection surface is "L1", a distance of a route for the light beam emitting from the reflection surface of said reflection mirror and incident upon the lower end of said projection surface is "L2", a distance from the upper end up to the lower end of the screen on said projection surface is "Dv", and an angle defined by said screen center light beam and the normal line on said projection surface, and further on a plane including said screen center light beam and the normal line on said projection surface where said screen center light beam is incident thereupon, a normal line at a center of the display surface of said image display element, which is disposed on around an optical axis of said lens group, is inclined with respect to an optical axis of an optical system f said lens group.

And, according to the present invention, also for accomplishing the objection mentioned above, there is further provided a projection-type image displaying apparatus, having the projection optical unit described in the above, as well as, the image display element, being received within a housing thereof.

And, further, according to the present invention, for accomplishing the objection mentioned above, there is also provided a projection-type image displaying system, having the projection surface, upon which an image is projected, and also the projection-type image displaying apparatus described in the above.

According to the present invention mentioned above, there can be achieved superior effects, i.e., providing a projection optical unit, being relatively easy in manufacturing thereof, while achieving a wide-angle through the oblique projection, but without necessity of the additional optic system having a large aperture, also suppressing the distortion and the deterioration of spots down to the minimum even when changing the distance up to the projection surface (i.e., the screen), and further reducing the focus shifting in spite of adjustment of the screen position accompanying with an inclination of the apparatus. And, with using that, there can be also achieved superior effects of achieving a projection-type image displaying apparatus, being more compact in the outer sizes thereof, and further a projection-type image displaying system, shortening the distance up to the projection surface thereof.

BRIEF DESCRIPTION OF THE SEVERAL DRAWINGS

Those and other objects, features and advantages of the present invention will become more readily apparent from the following detailed description when taken in conjunction with the accompanying drawings wherein:

FIG. 1 is a cross-section view for showing the basic structures of a projection optical unit, according to an embodiment of the present invention;

FIGS. 2(a) and 2(b) are cross-section views for explaining lens surfaces of the projection optical unit mentioned above;

Figure 5A:
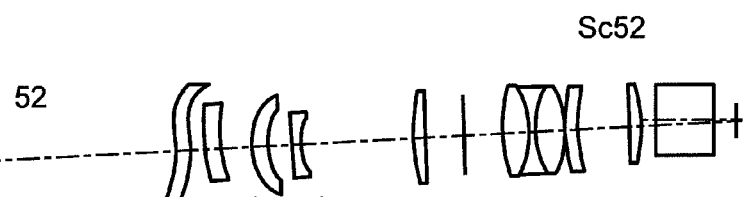
Figure 5B:
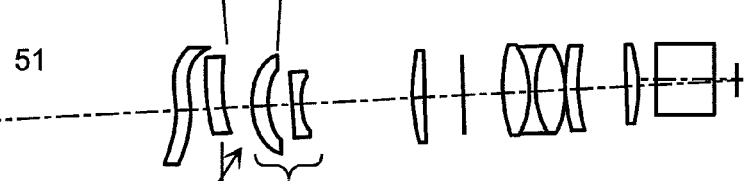
Figure 5C:
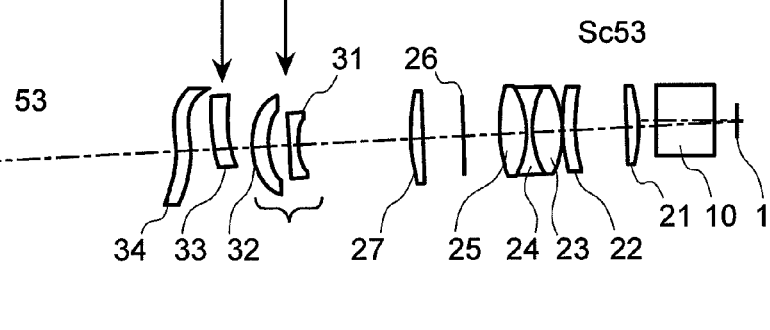
Figure 6:
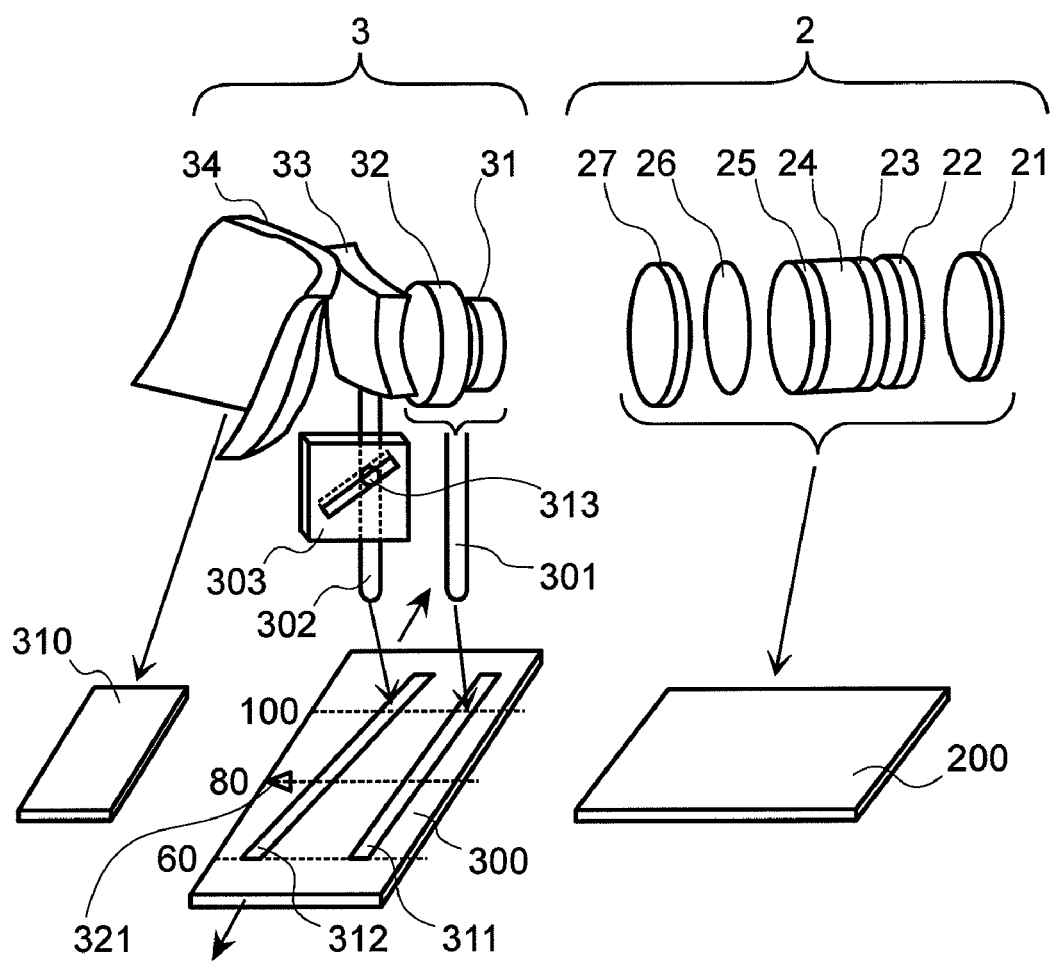
Figure 7:
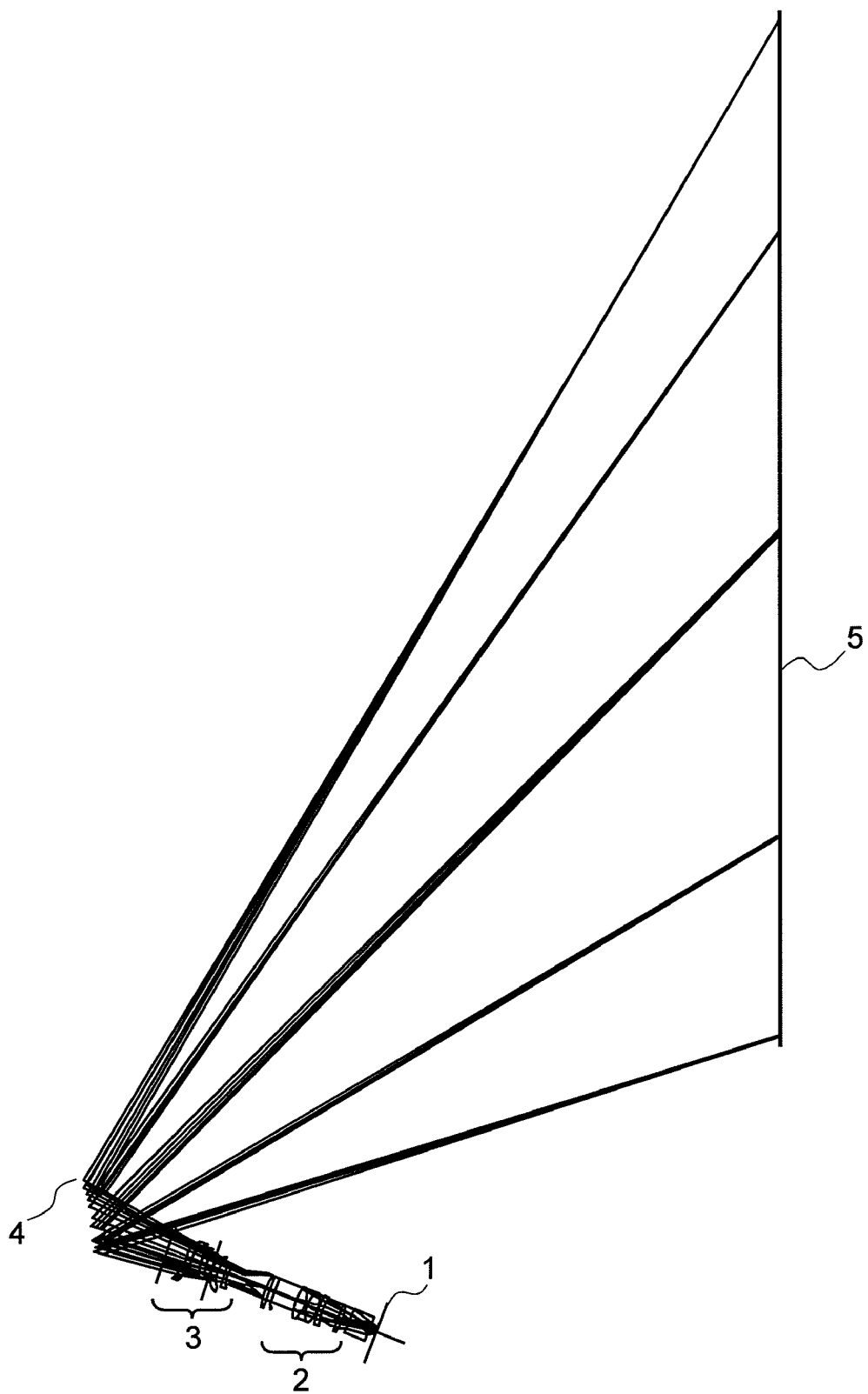
Figure 8:
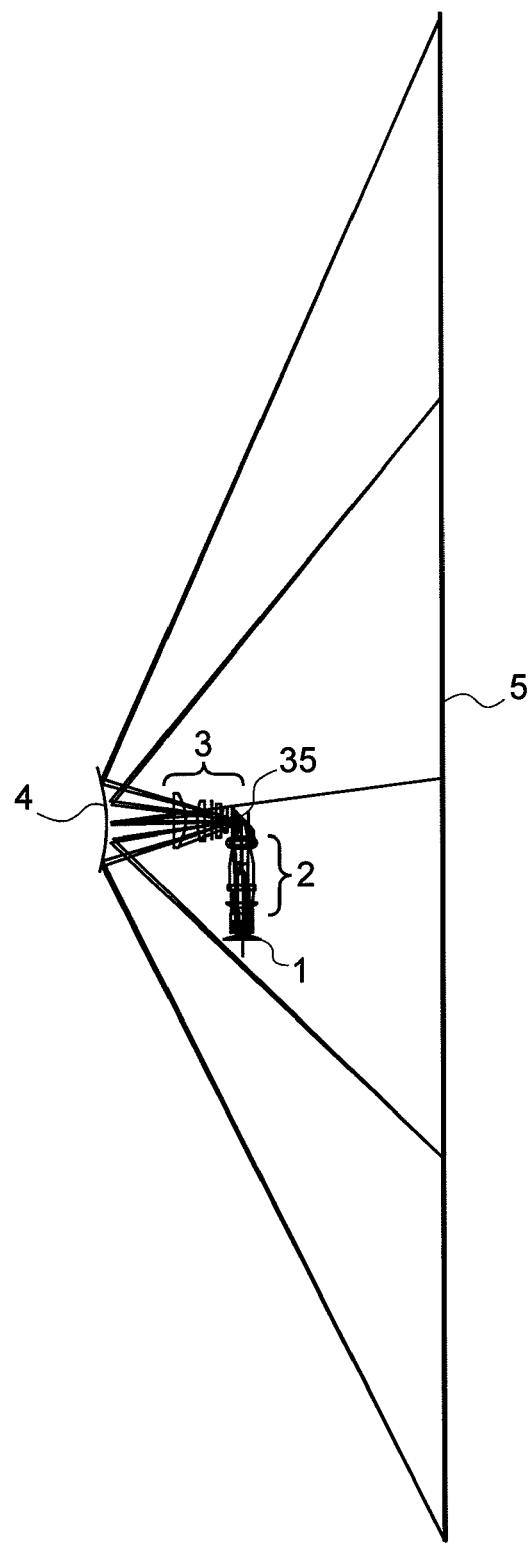
Figure 10:
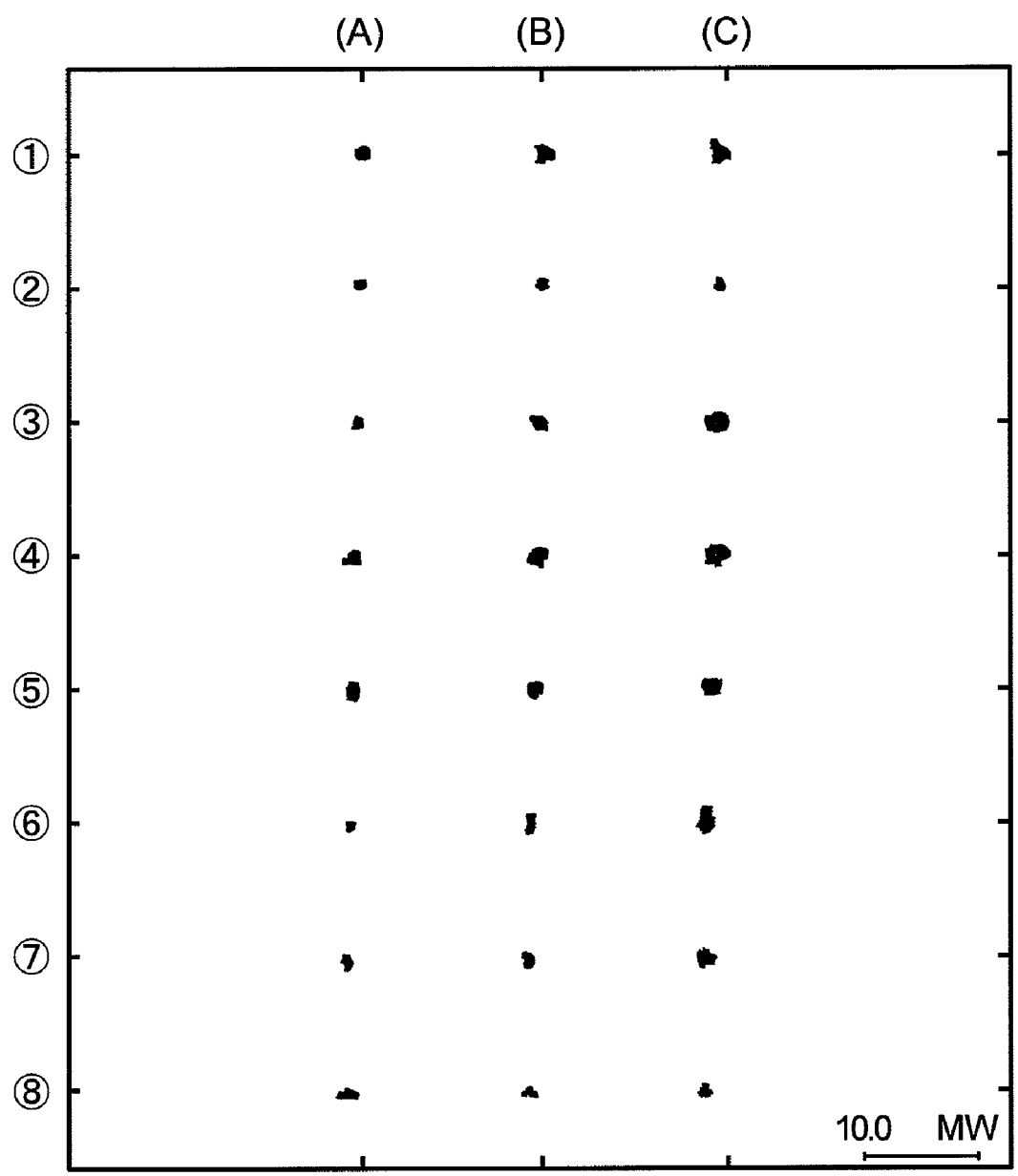
Figure 11:
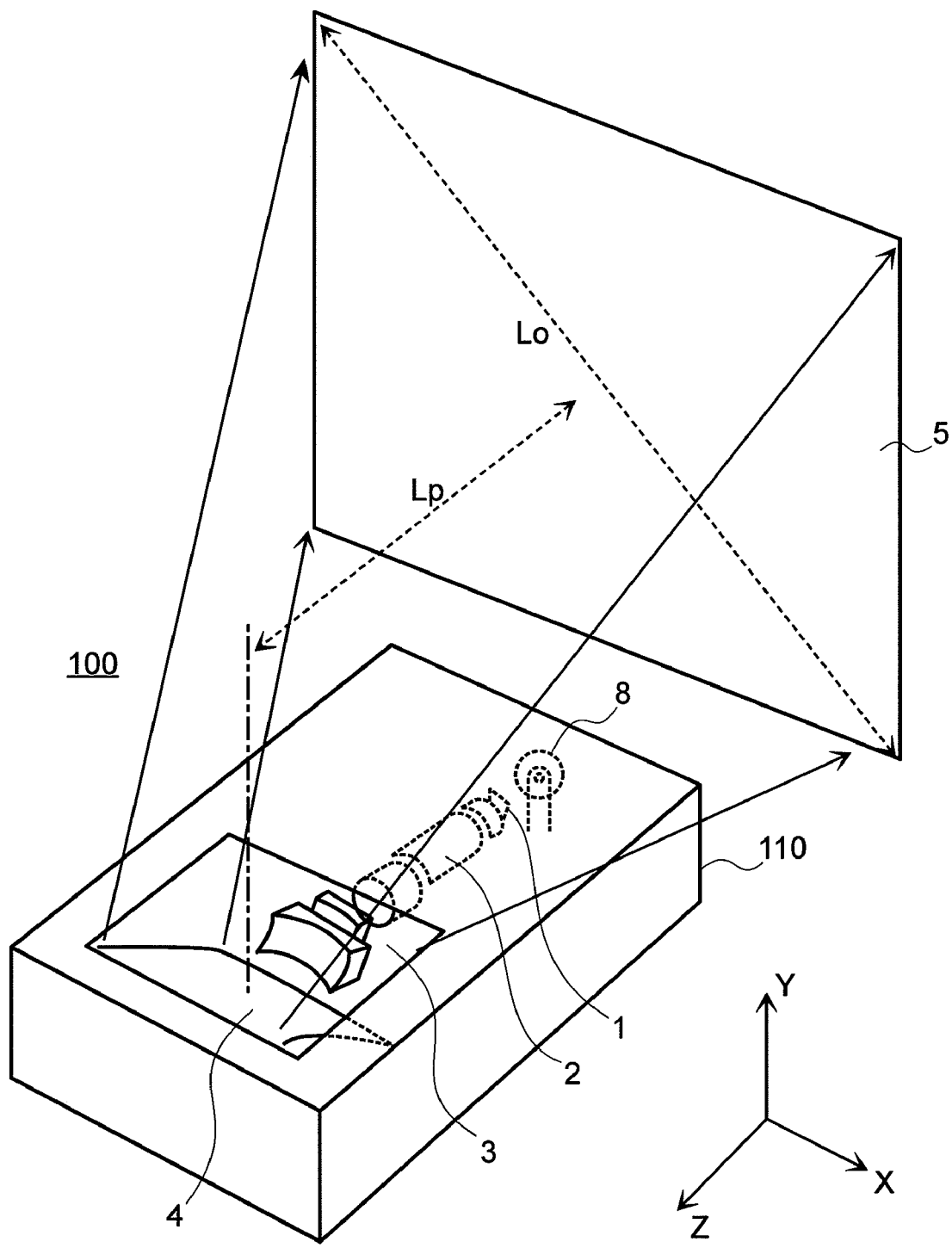
Figure 12:
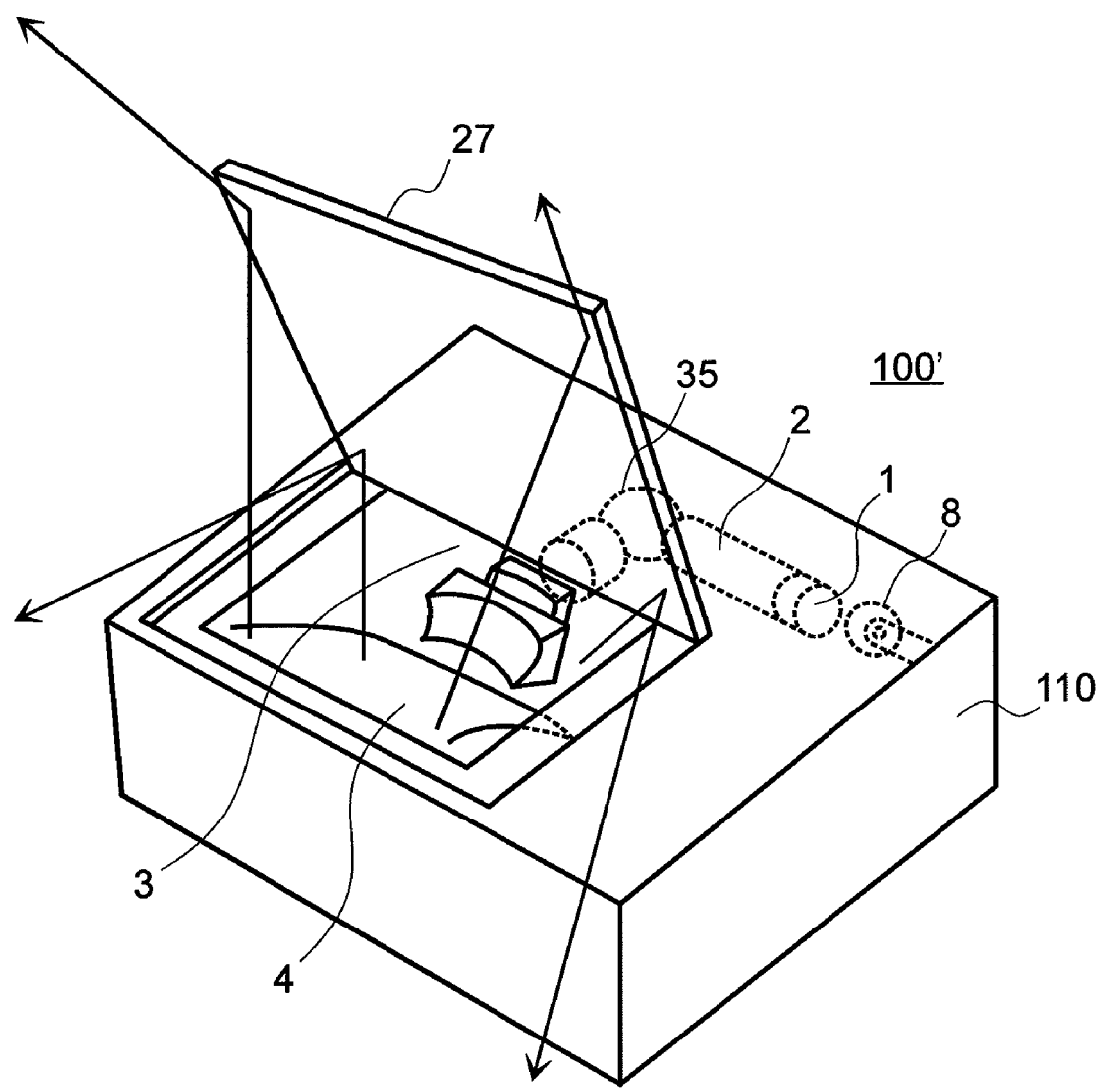
Figure 13:
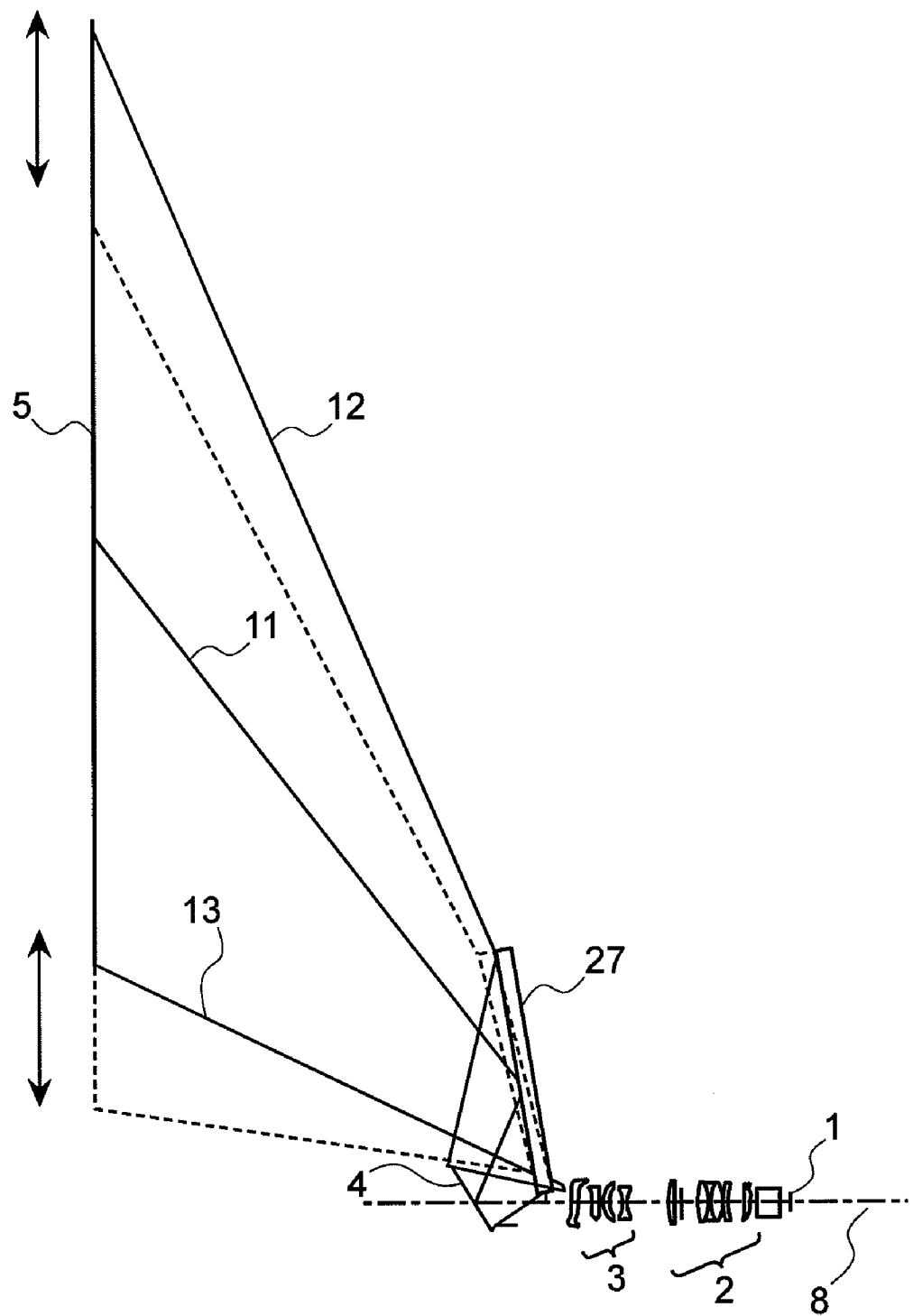

FIGS. 5(a) to 5(c) are views for showing the condition where a rear lens group is moved, within the projection optical unit mentioned above;

FIG. 6 is a view for showing an example of the detailed structures for moving the rear lens group, within the projection optical unit mentioned above;

FIG. 7 is Y-Z cross-section surface for showing the structures and optical paths of the projection optical unit, according to the embodiment of the present invention;

FIG. 8 is X-Z cross-section surface for showing the structures and optical paths of the projection optical unit, according to the embodiment of the present invention;

FIGS. 9(*a*) to 9(*c*) are views for showing the graphical distortion performances of the projection optical unit, according to the embodiment of the present invention;

FIG. 10 is a view for showing the spot performances of the projection optical unit, according to the embodiment of the present invention;

FIG. 11 is perspective view for showing the entire structures of the projection-type image displaying apparatus, according to the embodiment of the present invention;

FIG. 12 is perspective view for showing the entire structures of the projection-type image displaying apparatus, according to other embodiment of the present invention; and FIG. 13 is a cross-section view for showing the basic structures of the projection optical unit, within the projection-type image displaying apparatus according to other embodiment of the present invention.

DETAILED DESCRIPTION OF THE PREFERRED EMBODIMENTS

Hereinafter, embodiments according to the present invention will be fully explained by referring to the attached drawings.

Figure 1:
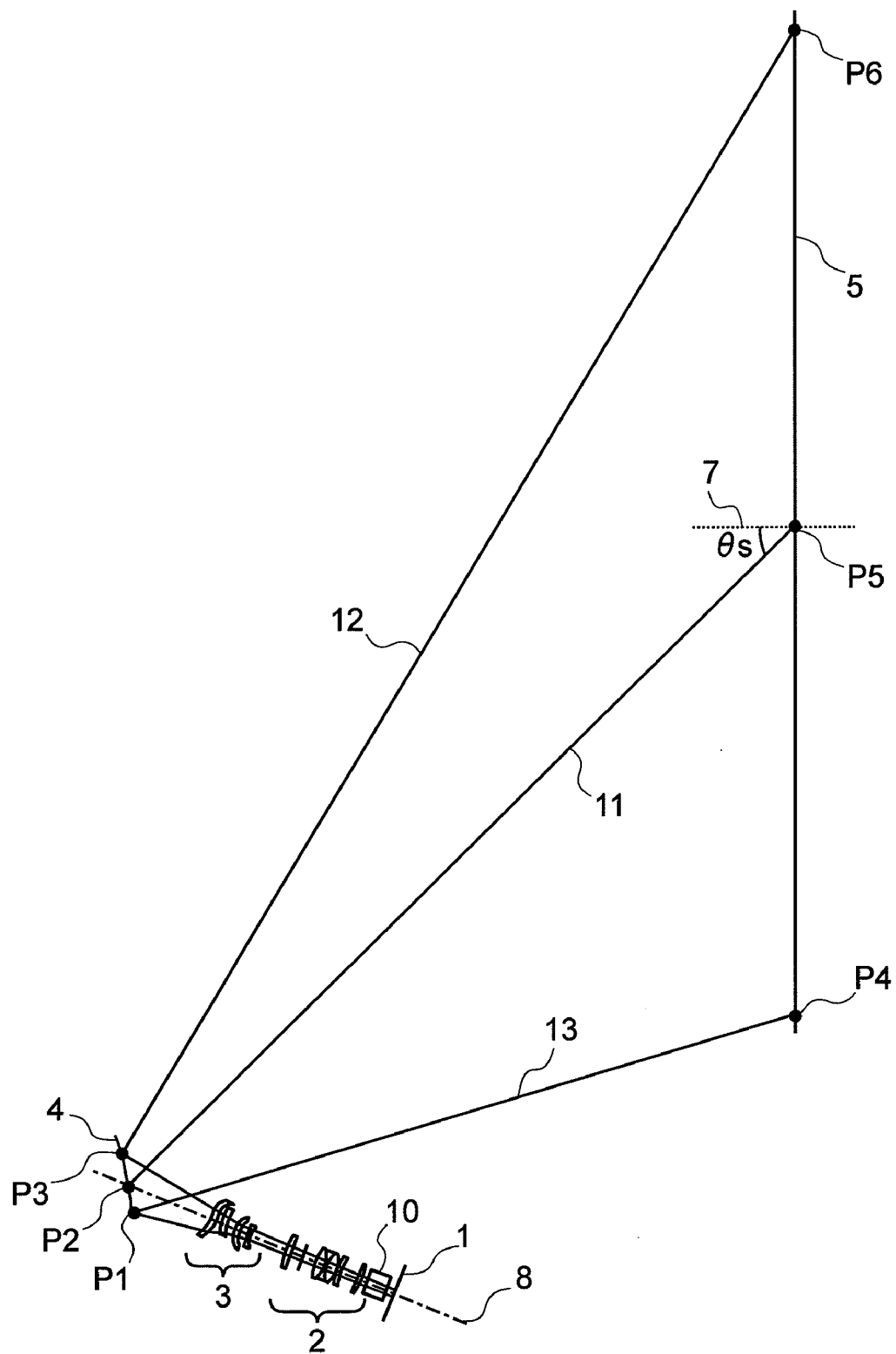

First of all, FIG. 1 attached herewith is a cress-section view for showing the basic optical structures of a projection optical unit, according to the present invention, wherein the structures of an optical system are shown on the Y-Z cross section, within the XYZ orthogonal coordinate system (shown by arrows in the figure).

As is shown in FIG. 1, the projection optical unit, according to the present invention, is constructed with an image display element 1, for emitting a desired image upon incidence of a light from a light source 8, and a prism 10, a transmission (lens) optical system constructed with two (2) sets of lens groups, including a front lens group 2 and a rear lens group 3 therein, and a reflection optical system including a reflection mirror 4 having a free-curved surface configuration reflection surface, being rotationally non-symmetric (i.e., a rotationally asymmetric) (hereinafter, being called "a free-curved surface mirror").

Herein, as the image display element 1, though there is shown an example of applying a transmission type, such as, a liquid crystal panel, representatively, for example, however the present invention should not be restricted only to this, and it may be a self-emission type, such as, a CRT, for example. Also, in case when applying the transmission type, such as, the above-mentioned liquid crystal panel or the like, for example, it is necessary to provide a lamp, to be a light source 8 for irradiating the liquid crystal panel. Also, as such the liquid crystal panel, it may be a so-called three (3) plates type, forming images of R, G and B, and in that case, it is necessary to provide a prism or the like, for use of synthesizing an image. However, an illustration is omitted herein, in particular, about the details of those liquid crystal panels and the light source 8 for irradiating them, which will be explained later, since they do not relate directly. On the other hand, with the self-emission type, such as, the CRT, it is apparent that there is no need of such the light source 8 as was mentioned above.

Within the projection optical unit having such the constructions as mentioned above, the light emitted from the image display element 1 is firstly incident upon the front lens group 2 building up the lens optic system. Although the details thereof will be explained later, this front lens group 2 is constructed with a plural number of refractive lenses, each having a rotationally symmetric surface configuration of a positive or a negative power. Thereafter, the light emitted from this front lens group 2 passes through the rear lens group 3, which is constructed with a plural number of lenses, including a plural number (two (2) pieces in this example) of lenses, each having the sculptured or free curved surface at least on one surface thereof, i.e., not rotationally symmetric (rotationally asymmetric). And, the light emitted from this rear lens group 3, further after being reflected enlargedly, upon a reflection optic system, including the reflection mirror (hereinafter, being called "free curved (or sculptured) surface mirror") 4, having the reflection surface of the free curved surface, not rotationally symmetric, it is projected onto a predetermined screen 5 (for example, a wall surface of a room or a sheet-like screen, etc.).

However, within the present embodiment, as is apparent from this FIG. 1, differing from the optic system shifting the projection screen (i.e., the display element) into the direction perpendicular to the optical axis of the projection system, and further disposing the additional optic system inclined by a predetermined angle with respect to the optical axis of the projection system, as is disclosed in the conventional arts (in particular, in the Patent Documents 1 and 2), the image display element 1 is so arranged that a center of the display screen thereof is approximately positioned on the optical axis of the optic system (i.e., nearly defining a coaxial optic system). Accordingly, the light beam 11 directing to a center of the image on the screen 5, emitting from a center of the display surface of the image display element 1 and passing through a center of an entrance pupil of the lens optic system (hereinafter, those will be called a "image center light"), propagates along the optical axis of the lens optic system (including the front lens group 2 and the rear lens group 3 mentioned above), approximately. Thereafter, this image center light 11, after being reflected at a point P2 upon the reflection surface 4 having the free curved surface of the reflection optic system (including the sculptured surface mirror), is incident upon a point 5 at a center of the image on the screen 5, obliquely, from a lower side with respect to a normal line 7 on the screen. Hereinafter, this angle is called an "oblique incident angle" and is presented by "θs". This means that, the light passing along the optical axis of the lens optic system is incident upon the screen, inclining to the screen, and it is substantially equal to provide the optical axis of the lens system inclining to the screen (i.e., an oblique incidence system).

However, as was mentioned above, an oblique incidence of the light upon the screen produces various kinds of aberrations, including so-called a trapezoidal distortion, i.e., an oblong configuration of projection from the image display element 1 becomes a trapezoid, and also other than that, due to the rotational asymmetry to the optical axis, etc., but according to the present invention, those are compensated upon the reflection surfaces of the rear lens group 3, which builds up the lens optic system mentioned above, and also those of the reflection optic system.

In particular, with the oblique incidence of the light projected from the image display element 1 mentioned above upon the screen 5, after being reflected upon the reflection surface of the reflection mirror 4 building up the reflection optic system mentioned above, since it enables to obtain an eccentricity (i.e., the deflection angle) much larger, being much larger comparing to that obtained through the lenses building up the lens optic system, and also it hardly produces the aberrations, therefore it is possible to suppress large-sizing of the apparatus, as well as, to obtain the wide angle of view. Thus, it is possible to build up the lens optic system, including the front lens group 2 and the rear lens group 3 mentioned above, as an optic system to be much smaller in the aperture thereof, comparing to that of the structures offsetting the additional optic system (i.e., an afocal converter, in particular, the Patent Documents 1 and 2) of the conventional technology mentioned above, thereby suppressing the trapezoidal distortion.

Also, projecting the light incident upon the reflection surface of the reflection mirror 4, which builds up the reflection optic system, while widening an angle thereof up to a predetermined largeness or sizes, by letting the rear lens group to bear that angle widening function in a part thereof, due to including the lens having the negative power therein, as was mentioned above, manufacturing thereof comes to be easy, comparing to the conventional structures of building up an enlarging projection system, with only the reflection mirror (the Patent Document 3). Thus, the lens optic system is manufactured, separately from the reflection optic system, and thereafter it is fixed with in a housing of the apparatus with adjusting the positions of both of those; i.e., it is suitable for mass production, in particular. Also, with disposing the rear lens group 3 for compensating the trapezoidal distortion, etc., in front of the above-mentioned front lens group 2, as was mentioned above, since the rear lens group 3 and the front lens group 2 can be disposed while reducing the distance between them, it is possible to achieve the apparatus, being compact, as a whole thereof, mounting the said projection optic unit therein, and also to obtain a preferable effect of enabling to reduce the height, in particular, below the screen.

In this manner, combining the transmission type lens optic unit having the free curved surface and the reflection optic system having the free curved surface, in particular, in case when applying them into an image display apparatus of a front projection type, it is possible to obtain an optic system being compact, small-sizing the apparatus as a whole, while achieving the wide angle of view, which is strongly required for that front projection type, with certainty and relatively easily.

Figure 2:
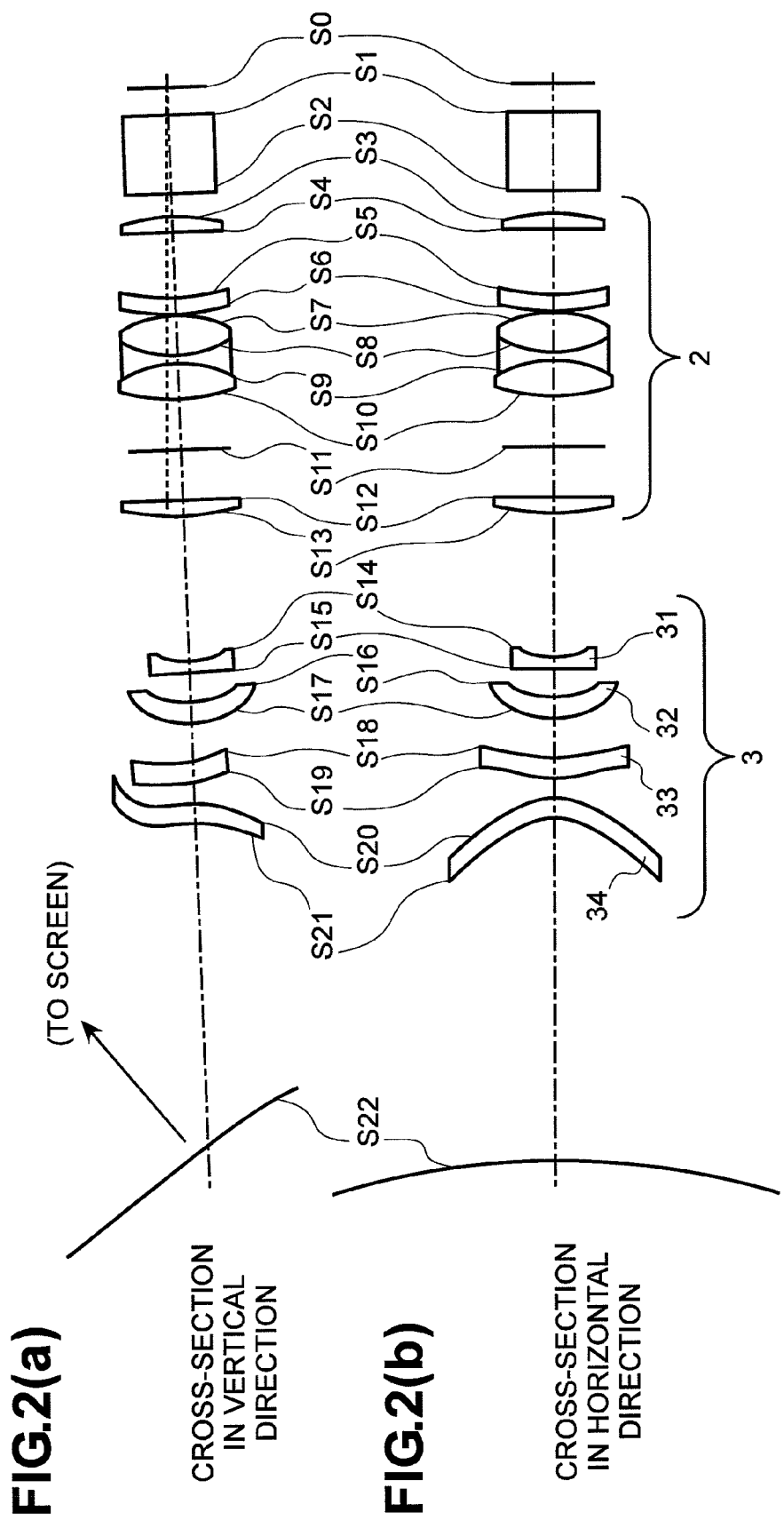

Next, FIGS. 2(*a*) and 2(*b*) show the cross-section views for explanation of the lens surfaces of the projection optical unit, according to the present invention, in particular, in the vertical direction and the horizontal direction thereof, i.e., FIG. 2(*a*) shows the cross-section in the vertical direction and FIG. 2(*b*) the cross-section in the horizontal direction thereof, respectively. As shown in FIGS. 2(*a*) and 2(*b*), within the lens optic system, an image emitted from the image display element 1 through the prism 10 is firstly incident upon the front lens group 2, including a plural number of lenses therein, which has the rotationally symmetric configuration. As was mentioned above, the front lens group 2 includes a spherical lens, being rotationally symmetric, and also an aspheric lens therein. Or, as will be mentioned later by referring to FIG. 8 later, a bending mirror may be disposed on the way between the front lens group 2 and the rear lens group 3, so as to bend the light at a right angle.

Also, the rear lens group 3 is constructed with at least two (2) pieces of free curved or sculptured surface lenses. As shown in those FIGS. 2(*a*) and 2(*b*), on the cross-section in the horizontal direction, a free curved surface lens 33, nearest to the reflection surface S22 of the reflection mirror 4, directs a concave into the direction of light emission, and a curvature of a portion, where the light passes through to be incident upon a low end of that screen, is determined to be larger than that of a portion, where the light passes through to be incident upon an upper end of that screen. Thus, it is assumed that, the free curved or sculptured surface lens has such a configuration, i.e., being curved directing the concave into the direction of emission of that light, and having the curvature in the portion where the light passes through to be incident upon the low end of that screen, being larger than that in a portion where the light passes through to be incident upon the upper end of that screen.

Also, according to the present embodiment, it is constructed to fulfill the following condition. Thus, within the cross-section shown in FIG. 1, it is assumed that the light incident upon a point P6 at an upper end of picture on the screen 5, being emitted from a lower end of screen on the image display element 1 and passing through a center of the entrance pupil of the front lens group 2, is a light 12. It is assumed that an optical path length is "L1" for this light 12 to reach the point P6 from a point P3 where this light 12 passes through the free curved surface mirror 4. Also, it is assumed that the light incident upon a point P4 at the lower end of picture on the screen 5 is a light 13, being emitted from the upper end of screen of the image display element 1 and passing through the center of the entrance pupil of the front lens group 2. It is assumed that the optical pass length is "L2" for this light 13 to reach the point P4 from the point P1 where this light 13 passes through the free curved surface mirror 4. And, the projection optic unit mentioned above is so constructed that the "L1" and the "L2" satisfy the following equation (Eq. 1):

$$|L1-L2|<1.2*\sin\theta s*Dv \qquad (\text{Eq. 1})$$

However, where "Dv" is a size of the picture on the screen, within the cross-section shown in FIG. 1, and in other words, it is a distance from the point P6 at the upper end of picture to the point P4 at the lower end thereof on the screen. Also, "θs" is the oblique incident angle mentioned above.

On the other hand, although the image display element 1 mentioned above is disposed in such a manner that the center of the display screen or image thereof is located on the optical axis of the lens optic system mentioned above, or alternatively, it is preferable to dispose it in such a manner that the normal line on the said display image is inclined a little bit to the optical axis of the lens optic system mentioned above, as is shown in FIG. 2(*a*) attached herewith.

However, when seeing FIG. 1, as was mentioned previously, the optical path length reaching from the point P3 to the point P6 is longer than the optical path length reaching from the point P1 to the point P4. This means that the image point P6 is farther from than the image point P4. Then, if an object point (i.e., a point in the display image) corresponding to the image point P6 on the screen is located at a point nearer to the lens optic system and also if an object point corresponding to the image point P4 is located at a position farther from the lens optic system, it is possible to compensate the inclination of an image surface. For that purpose, it is preferable to incline a normal line vector at a center on the display image of the image display element 1, a little bit, as is shown in FIG. 2(*a*), with respect to the optical axis of the lens optic system, within a plane defined to include the normal line of the screen 5 and the light at the center of the image therein. And, it is preferable that the direction of that inclination is opposite to the direction into which the screen 5 is positioned.

However, a method for inclining an abject surface for the purpose of obtaining an image surface inclined to the optical axis is already known, but within a practical region of the angle of view, deformations asymmetric to the optical axis are produced upon the image surface, which is obtained through the inclination of the object surface, and therefore it is difficult to make compensation by means of a projection lens, which is rotationally symmetric. According to the present embodiment, because of applying the free curved surface lens 31 and further also the free curved surface lens 32, which are rotationally asymmetric, within the rear lens group 3 mentioned above, it is possible to treat with the deformations upon the asymmetric image surface. For this reason, inclination of the object surface, i.e., the display surface of the image display element, enables to reduce the distortions of low dimensions on the image surface, greatly, and therefore it is effective for assisting the compensation of aberrations due to the free curved surface.

Next, with the function of each of the optical elements mentioned above, in particular, within the lens optic system mentioned above, the front lens group 2, they build up a main lens for projecting the display image of the image display element 1 onto the screen 5, and also compensate the basic aberrations within the optic system that is rotationally symmetric. And, the rear lens group 3 (i.e., lenses 31 to 34) within the lens optic system mentioned above, they are made up with lenses, each having the free curved surface, being not rotationally symmetric (i.e., rotationally asymmetric). Further, since the reflection optic system 4 mentioned above is built up with the reflection surfaces, each having the free curved surface configuration that is not rotationally symmetric, then it mainly compensates the aberration, which is produced due to the oblique incidence of the light. Thus, within such the structures as was mentioned above, the mirror 4 building up the reflection optic system mentioned above mainly compensates the trapezoidal distortion, while the rear lens group 3 of the lens optic system mainly compensates the asymmetric aberrations, such as, the distortion on the image surface, etc.

As was mentioned above, according to the present embodiment, the reflection optic system mentioned above is built up with one (1) piece of the reflection surface (i.e., mirror) 4 having the free curved surface configuration that is not rotationally symmetric, while the rear lens group 3 of the lens optic system includes two (2) pieces of the transmission-type lenses (i.e., the lenses 33 and 34 on the side of reflection mirror 4), in the structures thereof. Herein, the free curved surface mirror 4 is curved directing a convex into the direction of reflection. And, a curvature on a portion of the free curved surface mirror 4, reflecting the light to be incident upon a lower end of the screen, is determined to be larger than the curvature of a portion thereof, reflecting the light to be incident upon an upper end of the screen. Or, a portion reflecting the light to be incident upon the lower end of the screen may be defined into a configuration convex to the reflecting direction of the light, on the other hand, a portion reflecting the light to be incident upon the upper end of the screen into a configuration concave to the reflecting direction thereof.

Figure 3:
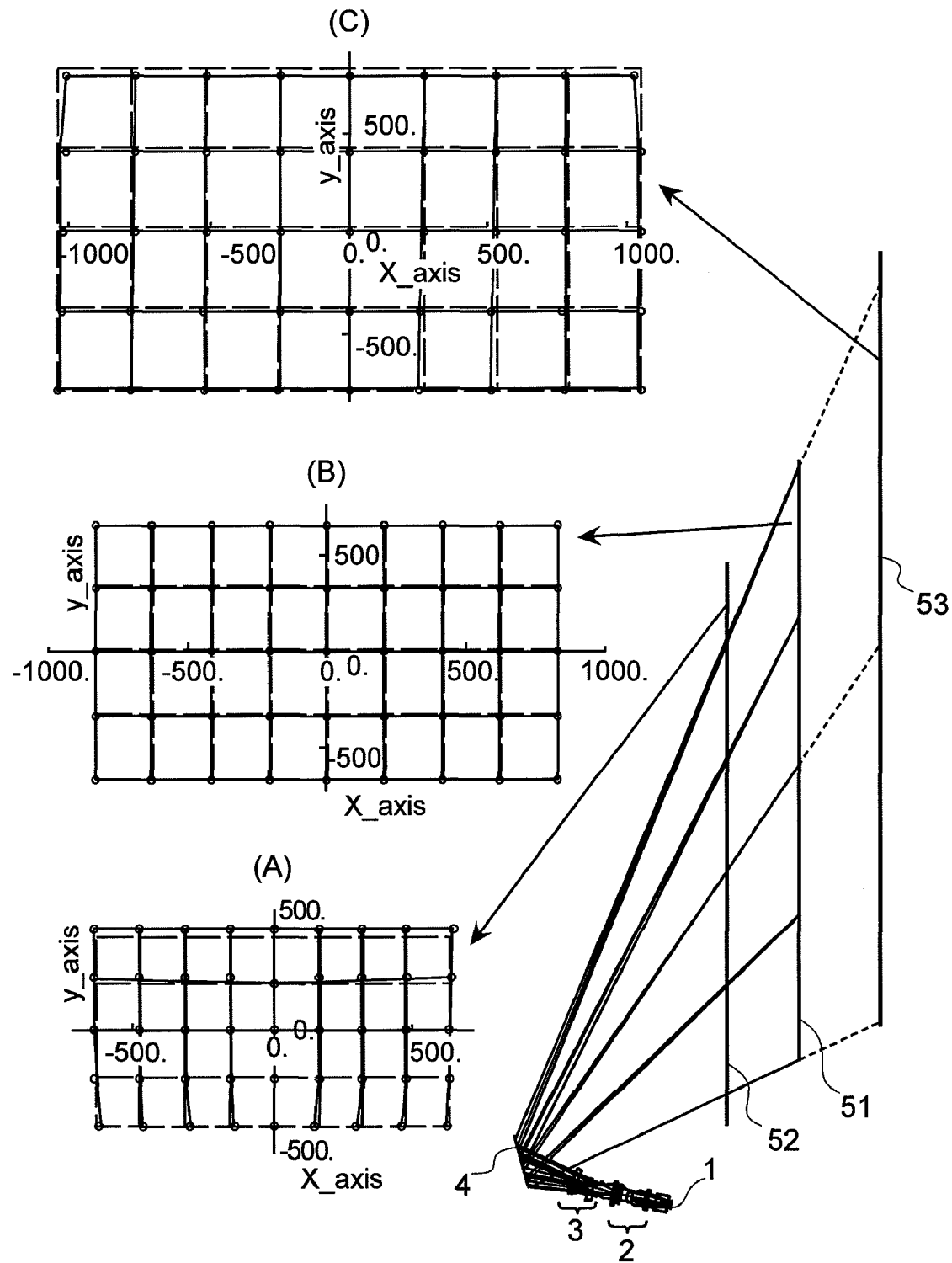
FIG. 3 is a view for showing the structures and the condition of graphic distortions when changing the projection distance, within a projection-type image displaying apparatus applying the above-mentioned projection optical unit therein.
Figure 4:
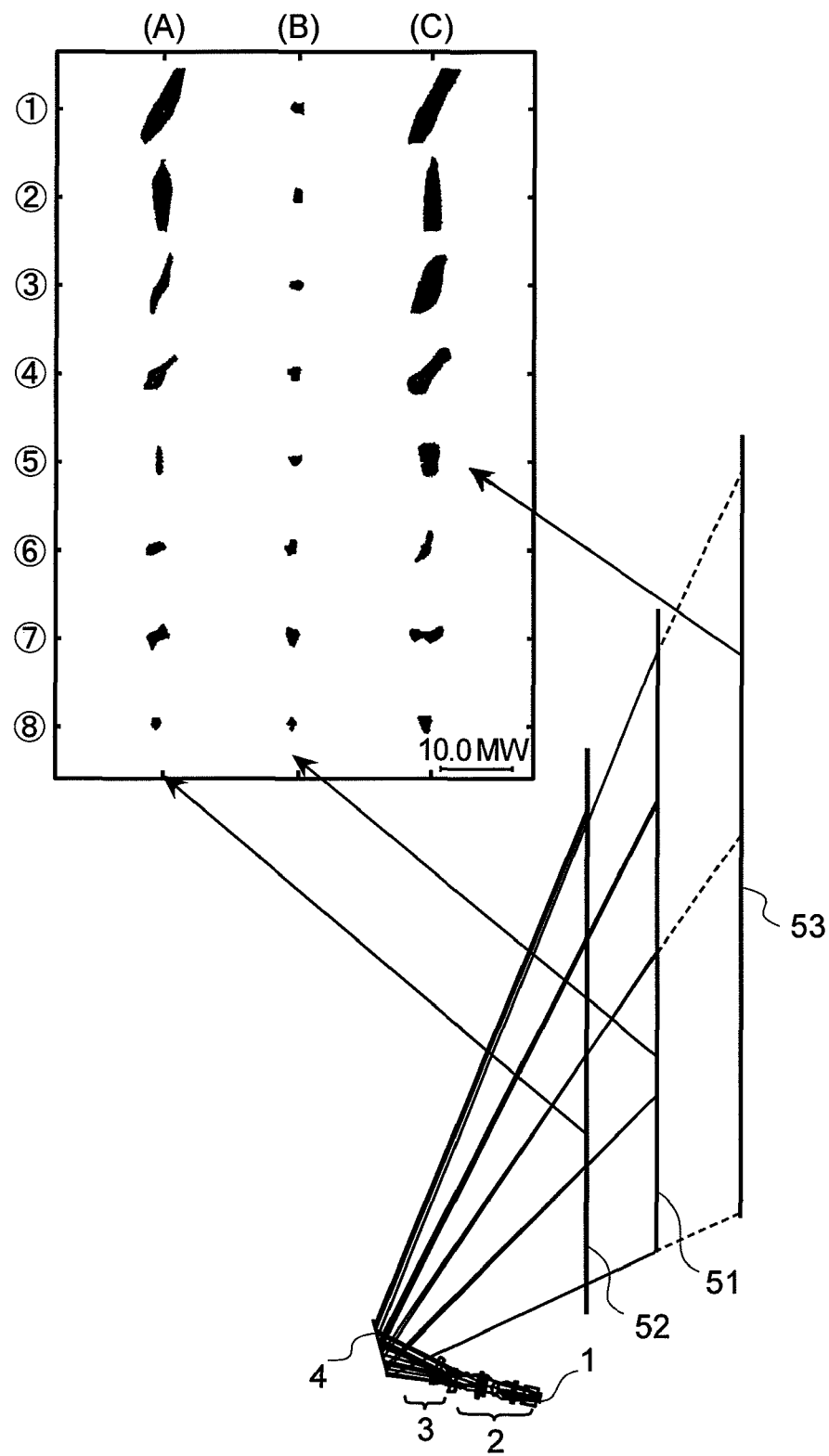
FIG. 4 is a view for showing the conditions of spots when changing the projection distance, within the projection-type image displaying apparatus applying the above-mentioned projection optical unit therein.

FIG. 3 is a view for showing the structures and the condition of the graphic distortion when changing the projection distance, within the projection-type image displaying apparatus applying therein the projection optical system, according to the present invention. FIG. 4 is a view for showing the conditions of a spot when changing the projection distance, within the projection-type image displaying apparatus applying therein the projection optical system, according to the present invention. FIG. 3 shows a problem when changing the projection distance from the projection optical unit up to the screen, within the optical system of conducting an oblique projection method while inclining an optical axis with respect to the screen. Thus, as is shown in this FIG. 3, in case when moving the screen position, largely, from the designed position thereof, thereby trying to change the projection distance greatly, it is possible to bring in focus by an adjustment, such as, changing the distance between the panel and the lens, etc., in the rotationally symmetric optic system not projecting obliquely, and the screen distortion does not change greatly; however in the optic system applying the method of obliquely projection the light inclining the optical axis thereof to the screen, the distortion becomes large, and also, as is shown in FIG. 4, the spot size also becomes large, then the picture quality thereof is deteriorated, greatly.

In FIG. 3 are shown the conditions of the picture distortions, in case when locating the position of the screen 5 at a position 52 in the direction for reducing the projection image, from the design position 51 (i.e., designed screen size, for example, corresponding to 80 inches), and locating it at a position 53 in the direction for enlarging the image (for example, corresponding to 100 inches), respectively. In this FIG. 3, (A) shows the picture distortion at the screen position 52, (B) the screen distortion at the screen position 51, and (C) the picture distortion at the screen position 53, respectively.

In FIG. 4, there are shown spot configurations at eight (8) points on the screen or image, but at three (3) different screen positions, similar to that shown in FIG. 3. Those eight (8) points include eight (8) points, i.e., (0.5,0.5), (0,0.5), (0.3, 0.3), (0.5,0), (0,0), (0.3,−0.3), (0.5,−0.5), and (0,−0.5), i.e., being described with the horizontal axis X, which is normalized by horizontal screen width, and vertical axis Y, which is normalized by vertical screen height, surrounding the point of original at the center of the screen or image, and they are shown by (1) to (8) in FIG. 4, from the top thereof, in the sequential order thereof. Herein, the Y-axis is positive directing into an upper direction in FIG. 4, in the vertical direction of the screen or image. Also, in FIG. 4, (A) shows the spot configurations at the screen position 52, (B) the spot configurations at the screen position 51, and (C) the spot configurations at the screen position 53, respectively. As apparent from those, the distortion grows up in the magnitude or size thereof, to be large, approximately up to be equal 2% or greater than the height or width of the screen or image, and the spot configuration also comes to be equal as 5 times large or more as that when the screen is at the designed position, i.e., deteriorating in the resolution capacity.

An increase of the spot size disables the spot configurations to be made preferable on the entire screen or image, even when moving the potion of the panel back and forth to be in focus. The reason of that lies in, as is shown in FIG. 4, that an increasing amount of the spot size differs depending on the position on the screen or image, and the optic system is not rotationally symmetric, even if brining a part of the screen or image to be in focus, with movement of the panel or the rotational asymmetric lens, but the other portion comes out from the condition of being in focus. It is also difficult to correct this spot configuration, with the movement of only the lenses 32 and 33 of the rear lens group, building up the free curved surface lens. This is because shifting of the focus point accompanying with the great movement of the screen position necessitates a power of the rotational symmetric lens.

Then, it is found out that a projection optic system can be obtained, which generates no deterioration in performances responding to change of the projection distance, by bringing the configuration to be most suitable, so as to obtain a superior balancing in the performances at the various projection distances, including other lens(es) not moving.

Upon selection of the lens to be moved, as a result of moving the lens corresponding to the movement or shifting of the screen position, and thereby making a search on a lens, which brings about an effect of improving the distortion on the spot configuration and/or the resolution capacity, it is found out that, in particular, it is effective to shift the transmission lenses 33, having the free curved surface, into the directions, one in the optical axis and the other in the direction perpendicular to the optical axis on a plane defined by the optical axis and the normal line on the screen, while moving the lens 31 and the aspheric lens 33, each having the negative power and building up the rear lens group, as a unit, in the direction of the optical axis. An amount of shifting thereof differs from each other, respectively, when changing the projection distance, and each shifting is so made that it has a predetermined relationship with each other. Further, it is also effective to move the mirror 4 having the free curved surface. However, there are many difficulties to move the mirror 4, which is disposed to be inclined and also has the free curved surface being relatively large in the size, from a viewpoint of the structures of that apparatus.

And, it is also effective to adopt a method of independently moving the transmission lenses 33 and 34, each having the free curved surface, respectively, in the direction of optical axis, with moving the lens 31 having the negative power and the aspheric surface lens 32, both building up the rear lens group mentioned above, as a unit, but it is difficult to make an adjustment thereon, because the number of the lenses to be moved comes to three (3) pieces, and therefore it is most effective to move the lens 31 having the negative power in the direction of optical axis, and also to move the transmission lens 33 having the free curved surface in the directions, one in the optical axis and the other being perpendicular to the optical axis.

Also, with the free curved surface lens to be moved, it is also possible to obtain the similar effect by changing to the lens 34 in the place of the lens 33.

FIGS. 5(a) to 5(c) show the conditions of moving the lenses of the rear lens group, within the projection optical unit. In those FIGS. 5(a) to 5(c) are shown the conditions of moving a lens group, including the transmission lens 33 having the free curved surface, and the lens 31 having the negative power and the aspheric surface lens 32, as a unit, among those building up the rear lens group 3, to a predetermined position, fitting to the position of the screen, on which the projection is made, i.e., the screen or image sizes, respectively. However, FIG. 5(a) shows the case of disposing the screen at the position 52 into the direction for reducing the projection image (for example, corresponding to the screen size of 60 inches) within FIG. 4, FIG. 5(b) the case of disposing the screen at the position 51 (for example, corresponding to the screen size of 80 inches), and FIG. 5(c) the case of disposing the screen at the position 52 into the direction for enlarging the projection image (for example, corresponding to the screen size of 100 inches), respectively. In FIGS. 5(a) to 5(c) are shown the lenses, each being emphasized in the movement thereof, for the purpose of showing the manner of the movements of those lenses, clearly.

In this manner, with moving and adjusting the two (2) lens groups, into the direction of the optical axis, depending upon the distance up to the screen, i.e., the projection distance, it is possible to correct both, the focusing onto the screen and the picture distortion, between from the position 52 to the position 53 of the screen, and thereby enabling to obtain a preferable property or performance, as if it is like a focus adjusting operation achieved by the conventional rotational symmetric lens.

FIG. 6 shows an example of the detailed structures for moving the rear lens group, within the projection optical unit according to the present invention. As is shown in FIG. 6, as the structures for moving the lens groups 31-33 building up the rear lens group 3 mentioned above, for example, on three (3) pieces of mounting bases or plates 200, 300 and 310 are installed or mounted the front lens group 2 (i.e., the lenses 21-27, each being rotationally symmetric) the lenses 31-33 within the rear lens group 3, and the lens 34 of the rear lens group 3, respectively. On the mounting plate 200 are fixed the front lens group 2 (i.e., the lenses 21-27, each being rotationally symmetric) at the predetermined positions, and that mounting plate 200 is fixed within the apparatus. Also, on the mounting base 310 is fixed the lens 34 among the rear lens group 3 mentioned above, at the predetermined position, and that mounting base 310 is fixed within the apparatus. And, on the mounting plate 300 are formed curved grooves 311 and 312 in advance, and that mounting plate 300 is provided within the apparatus, in such manner that it is movable with respect to the mounting plate 200 mentioned above (i.e., in this example, as shown by an arrow in the figure, in the direction perpendicular to that of the optical axis of the lens group).

However, with the lenses 31-33 building up the rear lens group 3 mentioned above move, as is shown in FIGS. 5(a) to 5(c), the positions of the lens group, made up with the lenses 31 and 32, and the free curved surface lens 33 are moved, respectively, corresponding to the sizes (i.e., 60 inches, 80 inches, and 100 inches) of the screen, which can be obtained by projection upon the screen. Then, the grooves 311 and 312 are formed corresponding to the movements of those two (2) groups of lenses, and as shown in FIG. 6, the mounting plate 300, being movable, is so configured that the two (2) groups of lenses, i.e., the lens group made up with the lens 31 and the lens 32, and the lens 33 can be disposed at the desired positions thereof, respectively, corresponding to the position of a mark 321 indicative of a reference formed thereon (for example, the marks, "60" inches, "80" inches, and "100" inches, etc., are attached on the base of the apparatus, on which the mounting plate 300 is installed).

With this, it is possible to change the relative position of each lens of the rear lens group 3 (i.e., the lenses 31 to 33) to the front lens group 2, in accordance with a designated positional relationship therebetween, i.e., enabling to obtain preferable performances or properties on both, the graphic distortion and the focusing, for changes of projection distance between from the screen potion 52 to the position 53, with a simple or an easy operation, like the focus adjustment by means of the conventional rotational symmetric lens.

Also, as the structures for driving the lenses, in the place of the mounting plate mentioned above, it is also possible to achieve the similar function to that mentioned above, by applying a cylinder having on an outer periphery thereof, on which such the above-mentioned grooves are formed, for example.

Also, since the lens groups to be moved are only two (2) groups, then it is possible to adjust the focus and the distortion by repeating the movement of the lens group, being made up with the lenses 31 and 32, and the movement of the lens 33, alternately one by one, but disusing the mounting plate 300.

Furthermore, it is needless to say that the similar effect can be obtained by using the lens 34, in the place of the lens 33, as the free curved surface lens to be moved, among the rear lens group 3.

Hereinafter, explanation will be made on the embodiment of numerical values, in more details thereof.

Embodiment 1

Firstly, explanation will be made on the details of the projection optic unit, according to the present invention mentioned above, by referring to FIGS. 7 and 8 and further tables 1 to 4 below, while showing the detailed numerical values of the optical elements, including the lens optic system and the reflection optic system therein. FIG. 7 is Y-Z cross-section view for showing the structures of the projection optical unit, according to an embodiment of the present invention, and the optical paths therein. FIG. 8 is X-Z cross-section view for showing the structures of the projection optical unit, according to an embodiment of the present invention, and the optical paths therein. Thus, within XYZ rectangular coordinates system shown in FIG. 1 mentioned above, FIG. 12 shows the Y-Z cross-section, i.e., extending the optic system into the Z-axis direction. Also, FIG. 8 shows the structures on the X-Z cross-section. Further, in this FIG. 8 is shown an example of disposing the bending mirror 35 on the way between the front lens group 2 and the rear lens group 3, building up the lens optic system, and thereby bending the light path into the X-axis direction, once.

In the present embodiment, the light emitted from the image display element 1, which is below in FIG. 7, firstly passes through the front lens group 2 built up with only lenses, each having only surfaces that are rotationally symmetric, among the lens optic system including the plural number of lenses therein. Then, it passes through the rear lens group 3 including the free curved surface lens that is rotationally asymmetric, and is reflected upon the reflection surface of the free curved surface mirror 4 within the reflection optic system. The reflecting light thereupon is incident upon the screen 5.

Herein, the front lens group 2 of the lens optic system is built up with the plural number of lenses, all of which have a refracting surface of rotationally symmetric configuration, and four (4) of the refracting surfaces of those lenses have aspheric surfaces, each being rotationally symmetric, and others have the spherical surfaces. The aspheric surface being rotationally symmetric, which is used therein, can be expressed by the following equation, with using a local cylindrical coordinates system for each surface:

$$Z = \frac{cr^2}{1 + \sqrt{1 - (1+k)c^2 r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20} \quad \text{(Eq. 2)}$$

Where, "r" is the distance from an optic axis, and "Z" represents an amount of sag. Also, "c" is the curvature at an apex, "k" a conical constant, "A" to "J" coefficients of a term of power of "r".

On the other hand, the free curved surfaces building up the rear lens group 3 of the lens optic system mentioned above can be expressed by the following equation, including polynomials of X and Y, with applying the local coordinates system (x, y, z) assuming the apex on each surface to be the origin.

$$Z = \frac{cr^2}{1 + \sqrt{1 - (1+k)c^2 r^2}} + \sum_m \cdot \sum_n (C(m,n) \cdot x^m \cdot y^n) \quad \text{(Eq. 3)}$$

Where, "Z" represents an amount of sag of the free curved surface configuration, in particular, into the direction perpendicular to X- and Y-axes, "c" the curvature at the apex, "r" the distance from the origin within a plane of X- and Y-axes, "k" the conical constant, and C(m,n) the coefficients of the polynomials.

The table 1 below shows the numerical data of the optic system, according to the present embodiment. In this table 1, S0 to S22 correspond to the marks S0 to S22 shown in FIG. 3 mentioned above, respectively. Herein, the mark S0 shows the display surface of the image display element 1, i.e., the object surface, and S22 the reflection surface of the free curved surface mirror 4. Also, a mark S24 shows an incident surface of the screen 5, shown also in FIGS. 12 and 13, i.e., the image surface for clearly showing the inclination of the optical axis, later.

TABLE 1

| Surface | Rd | TH | nd | vd |
|---|---|---|---|---|
| S0 | Infinity | 7.600 | | |
| S1 | Infinity | 22.200 | 1.51827 | 48.0 |
| S2 | Infinity | 6.661 | | |
| S3 | 54.28 | 4.500 | 1.85306 | 17.2 |
| S4 | 5557.574 | 18.591 | | |
| S5* | −49.396 | 5.000 | 1.49245 | 42.9 |
| S6* | −45.359 | 0.100 | | |
| S7 | 33.839 | 11.700 | 1.49811 | 60.9 |
| S8 | −30.176 | 2.000 | 1.76014 | 20.0 |
| S9 | 31.651 | 10.500 | 1.49811 | 60.9 |
| S10 | −47.746 | 13.085 | | |
| S11 | Infinity | 15.916 | | |
| S12 | 458.977 | 5.500 | 1.85306 | 17.2 |
| S13 | −57.723 | 41.917 | | |
| S14 | −22.804 | 3.200 | 1.74702 | 33.2 |
| S15 | 174.905 | 8.561 | | |
| S16* | −25.702 | 6.000 | 1.49245 | 42.9 |
| S17* | −29.207 | 11.214 | | |
| S18# | Infinity | 6.000 | 1.49245 | 42.9 |
| S19# | Infinity | 6.956 | | |
| S20# | Infinity | 6.000 | 1.49245 | 42.9 |
| S21# | Infinity | 92.003 | | |
| S22# | Infinity | −996.0 | REFL | |
| S23 | Infinity | — | | |

Also, in the table 1 mentioned above, "Rd" is the radius of curvature for each surface (e.g., a reciprocal of the curvature "c" in the equations mentioned above), and it is presented by a positive value in case when having a center of curvature on the left-hand side of the surface in FIG. 3 mentioned above, while by a negative value in case when having it on the right-hand side, contrary to the above. "TH" is the distance between the surfaces, i.e., presenting the distance from the apex of the lens surface to the apex of the next lens surface. The distance between the surfaces is presented by a positive value in case when the next lens surface is at the left-hand side, while by a negative value in case when it is at the right-hand side, with respect to that lens surface.

Further, in the table 1 mentioned above, S5, S6, S16 and S17 are aspheric surfaces, being rotationally symmetric, and also in this table 1, they are attached with "*" beside the surface numbers for easy understanding thereof, wherein coefficients of the aspheric surface of those four (4) surfaces are shown in the table 2 below.

TABLE 2

| Surface | | | Aspheric Surface Coefficients | | | | | | |
|---|---|---|---|---|---|---|---|---|---|
| S5 | K | −17.08385 | C | 1.5362E−10 | F | 1.2762E−17 | J | 1.2821E−24 |
| | A | −9.573E−06 | D | −9.417E−13 | G | 1.6342E−19 | | |
| | B | 7.7844E−08 | E | −3.697E−15 | H | −8.981E−22 | | |
| S6 | K | −15.188926 | C | 1.7728E−10 | F | 2.5684E−17 | J | 3.1079E−25 |
| | A | −6.439E−06 | D | −1.204E−12 | G | −3.155E−20 | | |
| | B | 7.4155E−08 | E | −1.689E−15 | H | −1.457E−22 | | |

TABLE 2-continued

| Surface | | | Aspheric Surface Coefficients | | | | | |
|---|---|---|---|---|---|---|---|---|
| S16 | K | −1.9947668 | C | −5.885E−10 | F | −6.449E−17 | J | −7.59E−25 |
|  | A | 4.4263E−06 | D | 1.0946E−12 | G | −6.513E−19 | | |
|  | B | −1.229E−07 | E | 2.0921E−14 | H | 2.1666E−21 | | |
| S17 | K | 0.05198949 | C | −3.184E−11 | F | −3.851E−18 | J | 3.7426E−26 |
|  | A | 8.26E−06 | D | 5.6623E−13 | G | −6.63E−21 | | |
|  | B | −1.19E−07 | E | −5.887E−16 | H | −8.02E−24 | | |

Also, S18 to S21 in the table 1 mentioned above are the refracting surfaces, each having the free curved surface configuration, which builds up the rear lens group 3 of the lens optic system, and S22 is the reflection surface 4 having the free curved surface configuration S23 of the reflection optic system, wherein they are shown by attaching "#" beside the surface numbers thereof. Values of the coefficients for presenting the configurations of those five (5) free curved surfaces are shown in the table 3 below. Also, the values of coefficients of the free curved surfaces shown in the Table 3 are the values when assuming the direction from the right to the left is the positive direction on the Z-axis, while the direction from the upper to the lower is the positive direction on the Y-axis.

TABLE 3

| Surface | | | Free Curved Surface Coefficients | | | | | |
|---|---|---|---|---|---|---|---|---|
| S18 | | | C(4,1) | 5.9192E−07 | C(2,5) | −2.925E−09 | C(4,5) | 9.0632E−12 |
| | K | 0 | C(2,3) | 2.9943E−06 | C(0,7) | −7.847E−10 | C(2,7) | 5.5782E−12 |
| | C(2,0) | −0.0131433 | C(0,5) | 1.8057E−06 | C(8,0) | 5.9434E−11 | C(0,9) | −1.356E−12 |
| | C(0,2) | −0.0137563 | C(6,0) | 1.1988E−08 | C(6,2) | −2.245E−10 | C(10,0) | −1.481E−13 |
| | C(2,1) | −0.0006418 | C(4,2) | 7.2362E−08 | C(4,4) | −5.388E−10 | C(8,2) | 5.323E−14 |
| | C(0,3) | −0.0006581 | C(2,4) | 1.1203E−07 | C(2,6) | −6.331E−11 | C(6,4) | 8.0572E−13 |
| | C(4,0) | 1.9543E−06 | C(0,6) | 4.4119E−08 | C(0,8) | 3.8111E−11 | C(4,6) | −3.228E−14 |
| | C(2,2) | −1.223E−05 | C(6,1) | −1.428E−09 | C(8,1) | 7.3221E−13 | C(2,8) | −1.794E−13 |
| | C(0,4) | −7.541E−06 | C(4,3) | −7.1E−09 | C(6,3) | 9.6667E−12 | C(0,10) | −1.371E−13 |
| S19 | | | C(4,1) | 8.087E−08 | C(2,5) | −1.649E−09 | C(4,5) | 2.5517E−12 |
| | K | 0 | C(2,3) | 1.7671E−06 | C(0,7) | −1.493E−09 | C(2,7) | 6.2096E−12 |
| | C(2,0) | −0.0140925 | C(0,5) | 1.3595E−06 | C(8,0) | 5.1309E−11 | C(0,9) | 6.0294E−13 |
| | C(0,2) | −0.0106606 | C(6,0) | 1.5633E−08 | C(6,2) | −1.268E−10 | C(10,0) | −9.898E−14 |
| | C(2,1) | −0.0006582 | C(4,2) | 1.2E−08 | C(4,4) | −1.451E−10 | C(8,2) | 6.569E−14 |
| | C(0,3) | −0.0006891 | C(2,4) | 8.5457E−10 | C(2,6) | 1.8613E−10 | C(6,4) | 3.2973E−13 |
| | C(4,0) | 1.8205E−06 | C(0,6) | −1.143E−08 | C(0,8) | 1.3765E−10 | C(4,6) | −2.027E−13 |
| | C(2,2) | 6.896E−06 | C(6,1) | −1.396E−10 | C(8,1) | 1.056E−13 | C(2,8) | −3.723E−13 |
| | C(0,4) | 4.7344E−06 | C(4,3) | −2.812E−09 | C(6,3) | 3.4339E−12 | C(0,10) | −1.552E−13 |
| S20 | | | C(4,1) | −9.675E−07 | C(2,5) | 7.9884E−10 | C(4,5) | −6.311E−13 |
| | K | 0 | C(2,3) | −1.041E−06 | C(0,7) | −3.351E−10 | C(2,7) | 1.1911E−12 |
| | C(2,0) | 0.02399531 | C(0,5) | −1.021E−07 | C(8,0) | 1.1569E−12 | C(0,9) | 2.6072E−12 |
| | C(0,2) | 0.01321318 | C(6,0) | 2.5387E−10 | C(6,2) | 2.0673E−11 | C(10,0) | −1.034E−15 |
| | C(2,1) | 0.00080823 | C(4,2) | −3.107E−08 | C(4,4) | 4.7543E−11 | C(8,2) | −4.61E−15 |
| | C(0,3) | 0.00067562 | C(2,4) | −1.098E−09 | C(2,6) | 7.8469E−11 | C(6,4) | −2.71E−14 |
| | C(4,0) | −6.002E−06 | C(0,6) | −1.167E−09 | C(0,8) | −3.612E−11 | C(4,6) | −5.968E−14 |
| | C(2,2) | 9.3296E−06 | C(6,1) | 4.0845E−10 | C(8,1) | 5.9103E−14 | C(2,8) | −1.021E−13 |
| | C(0,4) | −1.771E−05 | C(4,3) | 1.0793E−09 | C(6,3) | −3.739E−13 | C(0,10) | −5.483E−15 |
| S21 | | | C(4,1) | −1.284E−06 | C(2,5) | 2.2144E−09 | C(4,5) | −1.397E−12 |
| | K | 0 | C(2,3) | −1.42E−06 | C(0,7) | −2.032E−10 | C(2,7) | −4.009E−13 |
| | C(2,0) | 0.02683947 | C(0,5) | −5.584E−07 | C(8,0) | 1.6979E−12 | C(0,9) | 1.3854E−12 |
| | C(0,2) | 0.01114959 | C(6,0) | 1.7114E−09 | C(6,2) | 1.6791E−11 | C(10,0) | −1.637E−15 |
| | C(2,1) | 0.00100469 | C(4,2) | −2.679E−08 | C(4,4) | 5.4531E−11 | C(8,2) | −2.325E−15 |
| | C(0,3) | 0.00074352 | C(2,4) | 4.1118E−09 | C(2,6) | 7.1613E−11 | C(6,4) | −3.432E−14 |
| | C(4,0) | −9.159E−06 | C(0,6) | 9.6684E−09 | C(0,8) | −5.623E−11 | C(4,6) | −6.286E−14 |
| | C(2,2) | 6.1356E−06 | C(6,1) | 6.9876E−10 | C(8,1) | −2.792E−14 | C(2,8) | −8.807E−14 |
| | C(0,4) | −2.125E−05 | C(4,3) | 1.6393E−09 | C(6,3) | −6.581E−13 | C(0,10) | 5.2577E−14 |
| S22 | | | C(4,1) | −1.575E−08 | C(2,5) | −2.114E−12 | C(4,5) | −2.094E−16 |
| | K | 0 | C(2,3) | 2.983E−09 | C(0,7) | 9.6852E−13 | C(2,7) | −5.697E−16 |
| | C(2,0) | 0.00397715 | C(0,5) | 6.1402E−09 | C(8,0) | −4.976E−15 | C(0,9) | 2.1601E−16 |
| | C(0,2) | 0.00163941 | C(6,0) | 4.6758E−11 | C(6,2) | 5.7565E−14 | C(10,0) | 2.4262E−19 |
| | C(2,1) | 7.1661E−05 | C(4,2) | −3.444E−10 | C(4,4) | −2.57E−14 | C(8,2) | −2.769E−18 |
| | C(0,3) | 3.484E−05 | C(2,4) | −7.925E−11 | C(2,6) | −4.842E−14 | C(6,4) | 6.8602E−18 |
| | C(4,0) | −3.758E−07 | C(0,6) | 6.1749E−11 | C(0,8) | 2.1865E−14 | C(4,6) | −4.673E−18 |
| | C(2,2) | 8.1513E−07 | C(6,1) | 2.4236E−12 | C(8,1) | −1.893E−16 | C(2,8) | 1.99E−19 |
| | C(0,4) | 5.245E−07 | C(4,3) | −4.229E−12 | C(6,3) | 7.9803E−16 | C(0,10) | −5.025E−19 |

Also, according to the present invention, as is shown in the vertical cross-section view of FIGS. 2(a) and 2(b), the object surface, i.e., the display screen of the image display element 1 is inclined by 2.98 degrees to the optical axis of the lens optic system. The conditions of inclination and eccentricity upon each lens surface are shown in Table 4. In this table 4, "ADE" is a magnitude of the inclination within the surface in parallel with the cross-section of FIGS. 2(a) and 2(b), and the direction of the inclination is assumed to be positive when it rotates into the anticlockwise within the cross-section in the figure, and a unit thereof is degree. Also, "YDE" is a magnitude of the eccentricity, and the eccentricity is set up within the vertical cross-section surface of FIG. 2(a), into the direction perpendicular to the optical axis, and it is assumed to be positive directing into a lower side on the cross-section of the figure, and a unit is "mm". The inclination of the image display element 1 with respect to the lens optic system can be expressed with "ADE" and "YDE" on the surface S3 in the Table 4.

TABLE 4

| Surface | ADE(°) | YDE(mm) |
|---------|--------|---------|
| S3 | 2.980 | −1.465 |
| S18 | 0.0 | 4.178 |
| S20 | 0.0 | −2.268 |
| S22 | 33.000 | −1.910 |

With the inclination and the eccentricity shown in the Table 4, the inclination and the eccentricity of the surface S3, all of the surfaces, including the surface S3 and those thereafter, are disposed on the inclined optical axis of the surface S3. Thus, to the optical axis exiting from a center of the surface S0, i.e., the image display element 1, the surface S3 and those thereafter are shifted by 1.465 mm, downward, on the cross-section in the vertical direction shown in FIG. 2(a), and is inclined by 2.98 degree into the anticlockwise direction. With this, the image display element 1 is inclined, relatively, with respect to the lens optic system mentioned above.

Judging from the eccentricity and the inclination of other surfaces, as shown in the Table 4, the S18 surface is shifted by 4.178 mm, upward, on the cross-section in the vertical direction shown in FIG. 2(a). This means that all the surfaces after S18 surface are shifted by 4.178 mm with respect to the S17 surface, i.e., the surface just before those surfaces. Also, the S20 surface and the S22 surface are same to, in the eccentricity thereof, and adding the amounts of eccentricity of the S20 surface and the S22 comes to −4.178 mm; i.e., being same to the amount of eccentricity of the S18 surface, in the magnitude but reversed in the polarity thereof. This means that the amount of eccentricity of the S22 is 0 mm with respect to the S17 surface mentioned above, i.e., indicating that they are locating at the same position.

Further, as is shown in the Table 4, the free curved surface mirror 4, which is indicated by a mark S22 in FIGS. 2(a) and 2(b), is set to be inclined by 33.0 degree, into the anticlockwise direction, while shifting the optical axis thereof with respect to the optical axis of the surfaces before that. With this, the light beam propagating along with the optical axis on the S21, after being reflected upon the S22, propagates into a direction inclining by 66 degree with respect to that incident light beam. Then, it is presumed that the surface after the S22, i.e., the S23 surface (i.e., an image surface), is disposed on the optical axis, which is inclined by 66 degree on the S22 surface.

However, judging from the Tables 1 and 3 mentioned above, it can be seen that the curvature "c" and the conic coefficient "k" are zero (0) in the present embodiment. Thus, the trapezoidal distortion, due to the oblique incidence, is generated, extremely large in the direction of the oblique incidence, but small in the direction perpendicular to this. Accordingly, there is necessity of function, greatly differing from, in particular, in the direction of the oblique incidence and in the direction perpendicular thereto, and without using the curvature "c" and/or the conic coefficient "k" mentioned above, which are rotationally symmetric and function in all directions, it is possible to compensate or correct an asymmetric aberration, preferably.

Also, in the present embodiment with the numerical values thereof, with making a design (i.e., a center of designing), mainly for projecting an image thereof, with setting the screen size on the display screen of the image display element 1, to be 12.16×6.84 mm (ratio 16:9), i.e., the objective surface S0, onto the image surface S23, enlarging to 80 inches (i.e., 1,841.9×1,036.1 mm with + over-scan), for example, it is possible to project fitting to the sizes from 60 inches (1,381× 777.0 mm) to 100 inches (2,032.4×1,295.1 mm) with changing of the projection distance.

A Table 5 shows changes of distances between the surfaces, and an amount of shifting into the Y direction, with respect to the lenses that are moving corresponding to the change of this projection distance. In this Table 5, corresponding to changes of the projection distance, the distances between surfaces, i.e., S13, S17, S19 and S22, and the shifting amounts of S18 and S20 are changed, and the values thereof are shown in the column below "Sc1" in case of the center of designing), below "Sc2" in case of 100 inches, and blow "Sc 3" in case of 60 inches, respectively.

TABLE 5

| | TH | | |
|---------|---------|---------|---------|
| Surface | Sc1 | Sc2 | Sc3 |
| TH s13 | 41.917 | 41.918 | 41.905 |
| TH s17 | 11.214 | 11.665 | 10.468 |
| TH s18 | 4.178 | 3.881 | 4.700 |
| TH s19 | 5.956 | 5.505 | 6.702 |
| TH s20 | −2.268 | −1.971 | −2.790 |
| TH s22 | −996.000 | −1257.086 | −735.026 |

Also, in the present embodiment with the numerical values thereof, an angle of the oblique projection, e.g., the angle "θs" defined between the central light beam on the screen and the normal line on the projection surface (shown in FIG. 1) is 44.9 degree (i.e., 1.2*sin θs=0.84), and the value of the difference |L1"L2| between the optical paths shown in Eq. 1 mentioned above is 0.63 times of the height of the image on the screen (i.e., the maximum value among those when projecting the 60 inches to when projecting 100 inches), and then they satisfy the (Eq. 1) mentioned above.

Figure 9A:
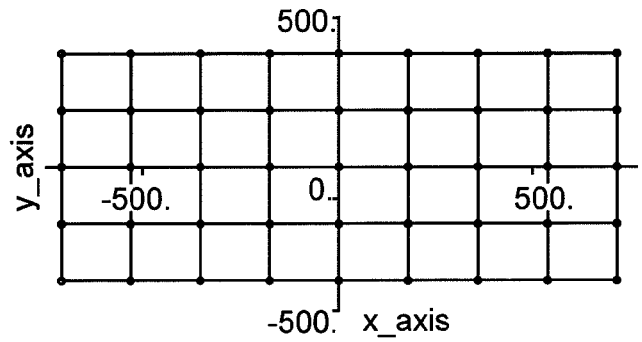
Figure 9B:
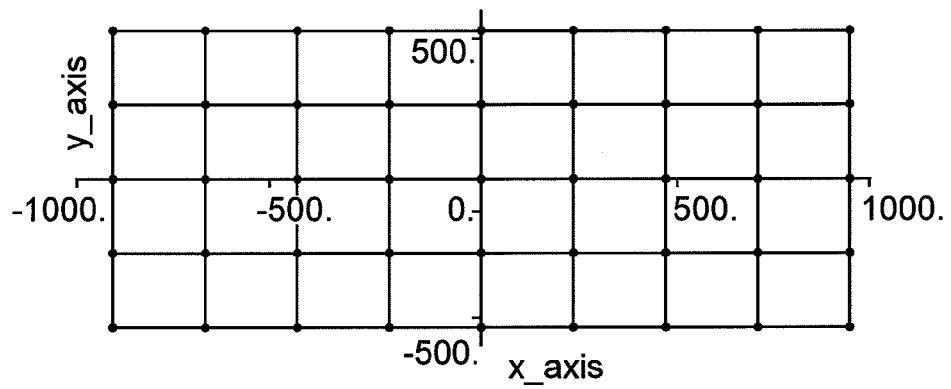
Figure 9C:
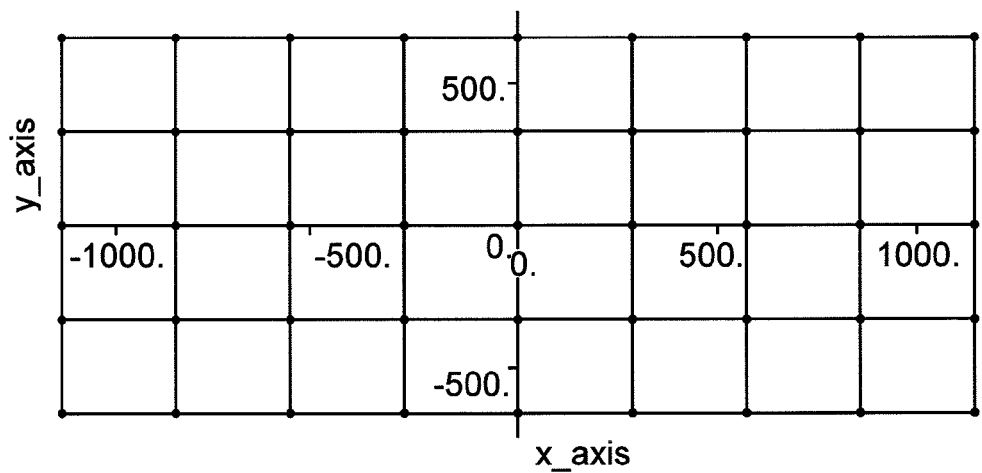

The graphical distortions of the embodiment with the numerical values thereof are shown in FIGS. 9(a) to 9(c). Those FIGS. 9(a) to 9(c) are views for showing the performances of the graphical distortions of the optical unit, according to the embodiment of the present invention. The vertical direction is those FIGS. 9(a) to 9(c) corresponds to the vertical direction shown in FIG. 7, and also the direction of Y-axis shown in FIG. 1. Also, the horizontal direction in those FIGS. 9(a) to 9(c) indicates the direction perpendicular to the Y-axis on the screen, and the central portion in an oblong in those FIGS. 9(a) to 9(c) corresponds to a center of the screen. However, those FIGS. 9(a) to 9(c) show the conditions of curvature for each line in case when displaying the screen, dividing into four (4) in the vertical direction while dividing into eight (8) in the horizontal direction, and thereby showing the state of the graphical distortion. In those FIGS. 9(a) to 9 (c) are shown the graphic distortion when the projection distance is at the center of designing (i.e., 80 inches of the screen size) in (B), the graphic distortion when the projection distance at the 60 inches of the screen size in (A), and the graphic distortion when the projection distance at the 100 inches of the screen size in (C), respectively. As shown in those figure, the graphic distortions are compensated or corrected, preferably.

Further. Spot diagrams are shown in FIG. 10 attached herewith. This FIG. 10 is a view for showing a spot performance of the optical unit, according to the embodiment of the present invention. In this FIG. 10 are shown spot diagrams of the light beams emitted from eight (8) points on the display screen of the image display element 1, i.e., (6.08, 3.42), (0, 3.42), (3.648, 2.052), (6.08, 0), (0,0), (3.648, −2.052), (6.08, −3.42) and (0, −3.42) by the values of X and Y coordinates assuming that the center of the display screen is an origin, in the order from the top thereof. However, the unit thereof is "mm". Also, in FIG. 10 are shown the spot when the projection distance is at the center of designing (i.e., 80 inches of the screen size) in (B), the spot when the projection distance at the 60 inches of the screen size in (A), and the spot when the projection distance at the 100 inches of the screen size in (C), respectively. Both of those maintain the preferable performances.

FIG. 11 is a perspective view for showing the entire structures of a projection-type image displaying apparatus, according to an embodiment of the present invention. Thus, in this figure, within an inside of an about box-like housing 110 building up the projection-type image displaying apparatus 100, there are provided the image display element 1 for displaying the image or the picture, which is inputted from a personal computer in an outside, and a light source 8, such as, a lamp generating high-brightness white lights therefrom, etc., and further there is also mounted the projection topical unit for irradiating the lights irradiated from that light source 8 and modulated on the image display element 1, enlargedly. And, in case when using this projection-type image displaying apparatus within a room, the lights emitted from that projection optical unit are projected on the screen 5, such as, a wall surface of the room or a sheet-like screen, etc., which is located opposite one direction of the housing 110 (i.e., the longitudinal direction in the figure), as shown by arrows in the figure.

Next, in FIG. 12 attached herewith is shown the projection-type image displaying apparatus, according to other embodiment of the present invention. Thus, as is apparent from the figure, within this projection-type image displaying apparatus 110', according to an embodiment of the present invention, in addition to the structures of the projection optical unit of the projection-type image displaying apparatus shown in FIG. 11 mentioned above, a bending mirror 35 is disposed on the way between the front lens group 2 and the rear lens group 3, thereby building up the structures for bending the light beam thereupon at the right angle, and further is disposed a plane reflection mirror 27 on the optical path between the free curved surface reflection mirror 4 and the screen 5, thereby building up the projection optical unit. However, in the example shown in this figure, the plane reflection mirror 27 shares the function, in common with, of covering an opening portion, which is formed on an upper surface of the housing 110 of the apparatus corresponding to the reflection mirror 4 of the free curved surface, and is provided to be freely opened/closed, in the above thereof.

With the structures of such the projection optical unit, as shown in FIG. 13 attached, the light emitted from the image display element 1 through the prism 10 is incident, at first, upon the front lens group 2 building up the lens optic system. Thereafter, the light emitting from this front lens group 2 passes through the rear lens group 3, which is constructed with the plural numbers of lenses, including the plural numbers of lenses (e.g., two (2) pieces in the present example), each having the free curved surface configuration, not rotationally symmetric at least on one surface thereof (i.e., rotationally asymmetric). And, the light emitted from this rear lens group 3, after being reflected upon the reflection mirror 4, having a reflection surface of the free curved surface configuration, but not being rotationally asymmetric (hereinafter, being called "a free curved surface mirror"), is further reflected upon the plane reflection mirror 27 mentioned above, and it is projected upon a predetermined screen 5 (for example, the wall surface of a room or the sheet-like screen, etc.). Thus, as is apparent from this figure, projection is made in the direction opposite to that in the embodiment shown in FIG. 1 mentioned above. Also, as apparent from this, with the structures of this projection-type image displaying apparatus 100', according to the other embodiment of the present invention, the optical path from the free curves surface mirror 4 up to the screen 5 is turned back upon the plane reflection mirror 27, therefore it is possible to reduce the distance up to the screen, i.e., being suitable for achieving a wide-angle.

Also, with the structures of this projection optical unit, as shown by broken lines in FIG. 13, the plane reflection mirror 27 mentioned above is so constructed that it can be adjusted in an inclination angle thereof, finely, by a minute angle. Thus, with this, also as shown by the broken lines and arrows in the figure, by changing the inclination angle of this plane reflection mirror 27, it is possible to change the position of the projection image or picture into up/down (i.e., vertically), on the screen 5, and it is possible to provide a suitable or preferable function, in particular, within the projection-type image displaying apparatus. Further, this plane reflection mirror 27 can be adjusted in the inclination angle thereof by a user, depending on the condition of using that projection-type image displaying apparatus, or it is also possible to build up, so that it moves (or, rises up) from the position, covering over the opening portion on the upper surface of the housing 110, through a driving mechanism, including an electric motor, etc., but not shown in the figure herein, and thereby to be disposed inclining at an angle that is determined by the user.

As was fully mentioned above, according to the present invention, since there is no necessity of shifting the lenses to be used therein, as in the conventional arts mentioned above, therefore no necessity is made on the additional optic system having a large aperture, further it is also possible to suppress the distortion down to the minimum even when changing the position up to the screen, while achieving a wide-angle thereof, and thereby providing the projection optical unit, being relatively easy in manufacturing thereof. And, with using such the projection optical unit, it is possible to achieve the projection-type image displaying apparatus, being preferable in the performances thereof, and further being more compact in sizes of the outer configuration thereof. And, furthermore, it is also possible to obtain the projection-type image displaying system, shortening the distance up to the projection surface while also achieving the wide-angle thereof.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A projection optical unit for obliquely projecting an image displayed on an image display element upon a projection surface, enlargedly, comprising:

a lens group, being disposed neighboring to said image display element, and including a plural number of projection lenses therein; and a reflection mirror for reflecting lights emitting from said lens group, to be projected onto said projection surface, obliquely, wherein assuming that a light beam, emitting from a center of the display screen of said image display element, passing through a center of an entrance pupil of said lens group, and entering into a screen center on said projection surface, is a screen center light beam, then said screen center light beam is incident upon said projection surface, obliquely, with respect to a normal line thereon, said lens group comprises a front lens group including a plural number of refraction lenses, being disposed thereafter directing from said image display element to said projection surface and having rotationally symmetric surface configurations, and a rear lens group including a refraction lens having a negative power and having a rotationally symmetric surface configuration and a plural number of lenses having rotationally asymmetric free curved surface configurations, and within said rear lens group, said lens having the negative power is movable in an optical axis direction, and at least one piece among said lenses having the free curved surface configurations is movable into directions, including the optical axis and direction perpendicular thereto, within a surface including the optical axis and the normal line on said screen.

2. The projection optical unit, as described in the claim 1, wherein said reflection mirror, for reflecting the light emitting from said lens group, is a reflection mirror, being convex into direction of the reflection in a part thereof and having a rotationally asymmetric configuration, and being so formed that a curvature of a portion for reflecting a light beam incident upon a lower end portion of said projection surface is larger than that of a portion for reflecting a light beam incident upon an upper end of said screen.

3. The projection optical unit, as described in the claim 1, wherein the following equation is satisfied:

$$|L1-L2| < 1.2 * \sin \theta s * Dv$$

where assuming a distance of a route for the light beam emitting from a reflection surface of said reflection mirror and incident upon the upper end of said projection surface is "L1", a distance of a route for the light beam emitting from the reflection surface of said reflection mirror and incident upon the lower end of said projection surface is "L2", a distance from the upper end up to the lower end of the screen on said projection surface is "Dv", and an angle defined by said screen center light beam and the normal line on said projection surface.

4. The projection optical unit, as described in the claim 1, wherein on a plane including said screen center light beam and the normal line on said projection surface where said screen center light beam is incident thereupon, a normal line at a center of the display surface of said image display element, which is disposed on around an optical axis of said lens group, is inclined with respect to an optical axis of an optical system of said lens group.

5. The projection optical unit, as described in the claim 1, wherein the following equation is satisfied:

$$|L1-L2| < 1.2 * \sin \theta s * Dv$$

assuming that a distance of a route for the light beam emitting from a reflection surface of said reflection mirror and incident upon the upper end of said projection surface is "L1", a distance of a route for the light beam emitting from the reflection surface of said reflection mirror and incident upon the lower end of said projection surface is "L2", a distance from the upper end up to the lower end of the screen on said projection surface is "Dv", and an angle defined by said screen center light beam and the normal line on said projection surface, and further on a plane including said screen center light beam and the normal line on said projection surface where said screen center light beam is incident thereupon, a normal line at a center of the display surface of said image display element, which is disposed on around an optical axis of said lens group, is inclined with respect to an optical axis of an optical system of said lens group.

6. A projection-type image displaying apparatus, comprising:

an image display element;

a projection optical unit for obliquely projecting an image displayed on said image display element upon a projection surface, enlargedly; and a housing receiving said image display element and said projection optical unit therein, wherein said projection optical unit comprises:

a lens group, being disposed neighboring to said image display element, and including a plural number of projection lenses therein; and a reflection mirror for reflecting lights emitting from said lens group, to be projected onto said projection surface, obliquely, wherein assuming that a light beam, emitting from a center of the display screen of said image display element, passing through a center of an entrance pupil of said lens group, and entering into a screen center on said projection surface, is a screen center light beam, then said screen center light beam is incident upon said projection surface, obliquely, with respect to a normal line thereon, said lens group comprises a front lens group including a plural number of refraction lenses, being disposed thereafter directing from said image display element to said projection surface and having rotationally symmetric surface configurations, and a rear lens group including a refraction lens having a negative power and having a rotationally symmetric surface configuration and a plural number of lenses having rotationally asymmetric free curved surface configurations, and within said rear lens group, said lens having the negative power is movable in an optical axis direction, and at least one piece among said lenses having the free curved surface configurations is movable into directions, including the optical axis and direction perpendicular thereto, within a surface including the optical axis and the normal line on said screen.

7. The projection-type image displaying apparatus, as described in the claim 6, wherein said reflection mirror, for reflecting the light emitting from said lens group, is a reflection mirror, being convex into direction of the reflection in a part thereof and having a rotationally asymmetric configuration, and being so formed that a curvature of a portion for reflecting a light beam incident upon a lower end portion of said projection surface is larger than that of a portion for reflecting a light beam incident upon an upper end of said screen.

8. The projection-type image displaying apparatus, as described in the claim 6, wherein the following equation is satisfied:

$$|L1-L2| < 1.2 * \sin \theta s * Dv$$

where assuming a distance of a route for the light beam emitting from a reflection surface of said reflection mirror and incident upon the upper end of said projection surface is "L1", a distance of a route for the light beam emitting from the reflection surface of said reflection mirror and incident upon the lower end of said projection surface is "L2", a distance from the upper end up to the lower end of the screen on said projection surface is "Dv", and an angle defined by said screen center light beam and the normal line on said projection surface.

9. The projection-type image displaying apparatus, as described in the claim 6, wherein on a plane including said screen center light beam and the normal line on said projection surface where said screen center light beam is incident thereupon, a normal line at a center of the display surface of said image display element, which is disposed on around an optical axis of said lens group, is inclined with respect to an optical axis of an optical system of said lens group.

10. The projection-type image displaying apparatus, as described in the claim 6, wherein the following equation is satisfied:

$$|L1-L2|<1.2*\sin\theta s*Dv$$

assuming that a distance of a route for the light beam emitting from a reflection surface of said reflection mirror and incident upon the upper end of said projection surface is "L1", a distance of a route for the light beam emitting from the reflection surface of said reflection mirror and incident upon the lower end of said projection surface is "L2", a distance from the upper end up to the lower end of the screen on said projection surface is "Dv", and an angle defined by said screen center light beam and the normal line on said projection surface, and further on a plane including said screen center light beam and the normal line on said projection surface where said screen center light beam is incident thereupon, a normal line at a center of the display surface of said image display element, which is disposed on around an optical axis of said lens group, is inclined with respect to an optical axis of an optical system of said lens group.

11. The projection-type image displaying apparatus, as described in the claim 6, wherein said reflection mirror, for reflecting the light emitting from said lens group, is a reflection mirror, being convex into direction of the reflection in a part thereof and having a rotationally asymmetric configuration, and being so formed that a curvature of a portion for reflecting a light beam incident upon a lower end portion of said projection surface is larger than that of a portion for reflecting a light beam incident upon an upper end of said screen, and said apparatus further comprising:

a plane mirror for reflecting a reflection light from said reflection mirror.

12. A projection-type image displaying system, comprising:

a projection surface, upon which an image is projected; and
a projection-type image displaying apparatus, having:
an image display element;
a projection optical unit for obliquely projecting an image displayed on said image display element upon a projection surface, enlargedly; and
a housing receiving said image display element and said projection optical unit therein, wherein said projection optical unit comprises:
a lens group, being disposed neighboring to said image display element, and including a plural number of projection lenses therein; and
a reflection mirror for reflecting lights emitting from said lens group, to be projected onto said projection surface, obliquely, wherein assuming that a light beam, emitting from a center of the display screen of said image display element, passing through a center of an entrance pupil of said lens group, and entering into a screen center on said projection surface, is a screen center light beam, then said screen center light beam is incident upon said projection surface, obliquely, with respect to a normal line thereon, said lens group comprises a front lens group including a plural number of refraction lenses, being disposed thereafter directing from said image display element to said projection surface and having rotationally symmetric surface configurations, and a rear lens group including a refraction lens having a negative power and having a rotationally symmetric surface configuration and a plural number of lenses having rotationally asymmetric free curved surface configurations, and within said rear lens group, said lens having the negative power is movable in an optical axis direction, and at least one piece among said lenses having the free curved surface configurations is movable into directions, including the optical axis and direction perpendicular thereto, within a surface including the optical axis and the normal line on said screen.

* * * * *